(12) United States Patent
He

(10) Patent No.: US 9,130,216 B2
(45) Date of Patent: Sep. 8, 2015

(54) INTEGRATED PHOTO-BIOELECTROCHEMICAL SYSTEMS

(75) Inventor: Zhen He, Bayside, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 555 days.

(21) Appl. No.: 13/546,111

(22) Filed: Jul. 11, 2012

(65) Prior Publication Data

US 2013/0017415 A1    Jan. 17, 2013

Related U.S. Application Data

(60) Provisional application No. 61/506,300, filed on Jul. 11, 2011.

(51) Int. Cl.
  *H01M 8/16* (2006.01)
  *C02F 3/00* (2006.01)

(52) U.S. Cl.
  CPC ............... *H01M 8/16* (2013.01); *C02F 3/005* (2013.01); *Y02E 60/527* (2013.01)

(58) Field of Classification Search
  None
  See application file for complete search history.

(56) References Cited

U.S. PATENT DOCUMENTS

| | | | |
|---|---|---|---|
| 4,824,534 A | 4/1989 | Tetzlaff et al. | |
| 5,976,719 A | 11/1999 | Kim et al. | |
| 6,165,341 A | 12/2000 | Sharifian et al. | |
| 7,709,113 B2 | 5/2010 | Logan et al. | |
| 7,811,690 B2 | 10/2010 | Eickhoff | |
| 2005/0255345 A1* | 11/2005 | Gerritse et al. | 429/13 |
| 2006/0011544 A1 | 1/2006 | Sharma et al. | |
| 2007/0259216 A1 | 11/2007 | Logan | |
| 2007/0259217 A1 | 11/2007 | Logan | |
| 2008/0073288 A1 | 3/2008 | Fan et al. | |
| 2008/0220292 A1 | 9/2008 | Rabaey et al. | |
| 2010/0151279 A1 | 6/2010 | Logan et al. | |
| 2010/0196742 A1* | 8/2010 | Nealson et al. | 429/2 |
| 2010/0270158 A1 | 10/2010 | Logan et al. | |
| 2011/0311887 A1 | 12/2011 | He | |
| 2013/0017414 A1 | 1/2013 | He | |

FOREIGN PATENT DOCUMENTS

| | | | |
|---|---|---|---|
| CN | 101764241 | * | 6/2010 |
| CN | 101853955 | * | 10/2010 |
| WO | 2013009797 | | 1/2013 |

OTHER PUBLICATIONS

PCT/US2012/046151 International Search Report and Written Opinion date mailed, Sep. 12, 2012 (13 pages).
Achilli, A. et al., "Selection of inorganic-based draw solutions for forward osmosis applications," Journal of Membrane Science (2010) p. 233-241, 364.

(Continued)

*Primary Examiner* — Jonathan Crepeau
(74) *Attorney, Agent, or Firm* — Michael Best & Friedrich LLP

(57) ABSTRACT

A bioelectricalchemical system includes an anode, an algal bioreactor, and a cathode. The anode is at least partially positioned within an anode chamber containing a first aqueous reaction mixture including one or more organic compounds and one or more bacteria for oxidizing the organic compounds. The algal bioreactor contains a second aqueous reaction mixture including one or more nutrients and one or more algae for substantially removing the nutrients from the second aqueous reaction mixture. The cathode is at least partially positioned within the algal bioreactor.

9 Claims, 13 Drawing Sheets

(56) References Cited

OTHER PUBLICATIONS

Achilli, A. et al., "The forward osmosis membrane bioreactor: A low fouling alternative to MBR processes," Desalination (2009) p. 10-21, 239.

Aelterman, P. et al., "Continuous electricity generation at high voltages and currents using stacked microbial fuel cells." Environmental Science and Technology (2006) p. 3388-3394, 40(10).

Anderson, J., "The environmental benefits of water recycling and reuse," Water Science and Technology: Water Supply (2003) p. 1-10, 3(4).

Angenent, L.T. et al., "Production of bioenergy and biochemicals from industrial and agricultural wastewater," Trends in Biotechnology (2004) p. 477-485, 22.

Beaudry, E.G. et al., "Membrane technology for direct osmosis concentration of fruit juice," Food Technology (1990) p. 121, 44(6).

Cao, X. et al., "A new method for water desalination using microbial desalination cells," Environmental Science & Technology (2009) p. 7148-7152, 43(18).

Cath, T.Y. et al., "A multi-barrier osmotic dilution process for simultaneous desalination and purification of impaired water," Journal of Membrane Science (2010) p. 417-426, 362.

Cath, T. Y. et al., "Forward osmosis: principles, applications, and recent developments," Journal of Membrane Science (2006) p. 70-87, 281.

Cath, T. Y. et al., "Membrane contactor processes for wastewater reclamation in space l. direct osmotic concentration as pretreatment for reverse osmosis," Journal of Membrane Science (2005) p. 85-98, 257.

Cath, T. Y. et al., "Membrane contactor processes for wastewater reclamation in space ll. combined direct osmosis, osmotic distillation, and membrane distillation for treatment of metabolic wastewater," Journal of Membrane Science (2005) p. 111-119, 257.

Chan, K. Y. et al., "Nitrogen and Phosphorus Removal from Sewage Effluent with High Salinity by Chlorella Salina," Environmental Pollution (1979) p. 139-146, 18:2.

Charcosset, C., "A review of membrane processes and renewable energies for desalination," Desalination (2009) p. 214-231, 245(1-3).

Chen, X. et al., "Stacked microbial desalination cells to enhance water desalination efficiency," Environmental Science and Technology (2011) p. 2465-2470, 45.

Cheng, S. et al., "Direct biological conversion of electrical current into methane by electromethanogenesis," Environmental Science & Technology (2009) p. 3953-3958, 43(10).

Chisti, Y., "Biodiesel from microalgae beats bioethanol," Trends in Biotechnology (2008) p. 126-131, 26(3).

Chisti, Y., "Biodiesel from microalgae," Biotechnology Advances (2007) p. 294-306, 25(3).

Chung, T.S. et al., "Forward osmosis processes: yesterday, today and tomorrow," Desalination, (2012) p. 78-81, 287.

Clauwaert, P. et al., "Biological Denitrification in Microbial Fuel Cells," Environmental Science & Technology (2007) p. 3354-3360, 41(9).

Clauwaert, P. et al., "Minimizing losses in bio-electrochemical systems: the road to applications," Applied Microbiology and Biotechnology (2008) p. 901-913, 79(6).

Cornelissen, E.R. et al., Water Science & Technology (2011) p. 1557-1565, 63(8).

Cusick, R.D. et al., "Phosphate recovery as struvite within a single chamber microbial electrolysis cell," Bioresource Technology (2012) p. 110-115, 107.

Elimelech, M. et al., "Yale constructs forward osmosis desalination pilot plant," Membrane Technology (2007) p. 7-8, vol. 2007, issue 1.

Fan, Y.H. et al., "Enhanced Coulombic Efficiency and Power Density of Air-cathode Microbial Fuel Cells with an Improved Cell Configuration," Journal of Power Sources (2007) p. 348-354, 171(2).

Fan, Y.H. et al., "Sustainable Power Generation in Microbial Fuel Cells Using Bicarbonate Buffer and Proton Transfer Mechanisms," Environmental Science & Technology (2007) p. 8154-8158, 41(23).

Fornero, J.J. et al., "Carbon Dioxide Addition to Microbial Fuel Cell Cathodes Maintains Sustainable Catholyte pH and Improves Anolyte pH, Alkalinity, and Conductivity," Environmental Science & Technology (2010) p. 2728-2734, 44(7).

Gao, Y. et al., "Characterization of forward osmosis membranes by electrochemical impedance spectroscopy," Desalination (2012), DOI:1 0.1 016/j.desa1.2012.03.006.

Ge, Z. et al., "Effects of draw solutions and membrane conditions on electricity generation and water flux in osmotic microbial fuel cells," Bioresource Technology (2012) p. 70-76, 109.

Gil, G.C. et al., "Operational parameters affecting the performance of a mediator-less microbial fuel cell," Biosens Bioelectron (2003) p. 327-334, 18.

Gruber, M.F. et al., "Computational fluid dynamics simulations of flow and concentration polarization in forward osmosis membrane systems," Journal of Membrane Science (2011) p. 488-495, 379.

Hancock, N. T. et al., "Solute coupled diffusion in osmotically driven membrane processes," Environmental Science Technology (2009) p. 6769-6775, 43(17).

He, Z., "One more function for microbial fuel cells in treating wastewater: producing high-quality water," Chemik (2012) p. 7-10, 66(1).

He, Z., et al., "Electricity generation from artificial wastewater using an upflow microbial fuel cell." Environmental Science and Technology (2005) p. 5262-5267, 39(14).

He, Z., et al., "An upflow microbial fuel cell with an interior cathode: assessment of the internal resistance by impedence spectroscopy," Environmental Science and Technology, (2006) p. 5212-5217, 40(17).

He, Z., et al., "Electricity Productin Coupled to Ammonium in a Microbial Fuel Cell," Environmental Science and Technology, (2009) p. 3391-3397, 43(9).

Hoffmann, J.P., "Wastewater Treatment with Suspended and Nonsuspended Algae," Journal of Phycology (1998) p. 757-763, 34(5).

Holloway, R.W. et al., "Forward osmosis for concentration of anaerobic digester centrate," Water Research (2006) p. 4005-4014, 41(17).

Hoover, L.A. et al., "Forward with osmosis: emerging applications for greater sustainability," Environmental Science & Technology (2011) p. 9824-30, 45(23).

Huang, C.H. et al., "Electrodialysis with bipolar membranes for sustainable development." Environmental Science & Technology (2006) p. 5233-5243, 40(17).

Huang, Y. et al., "Performance of microbial fuel cells with and without Nafion solution as cathode binding agent," Bioelectrochemistry (2010) p. 261-264, 79.

Jacobson, K. et al., "Efficient salt removal in a continuously operated upflow microbial desalination cell with an air cathode," Bioresource Technology (2010) p. 376-380, 102.

Jacobson, K. et al., "Use of a liter-scale microbial desalination cell as a platform to study bioelectrochemical desalination with salt solution or artificial seawater," Environmental Science and Technology, (2011) p. 4652-4657, 45(10).

Karagiannis, I.C., et al., "Water desalination cost literature: review and assessment," Desalination (2008) p. 448-456, 223(1-3).

Khawaji, A.D. et al., "Advances in seawater desalination technologies," Desalination (2008) p. 47-69, 221(1-3).

Kim, J. et al., "Anaerobic Fluidized Bed Membrane Bioreactor for Wastewater Treatment," Environmental Science & Technology (2011) p. 576-581, 45(2).

Kravath, R.E. et al., "Desalination of seawater by direct osmosis," Desalination (1975) 151-155, 16.

Kumar, M. et al., "Investigation of seawater reverse osmosis fouling and its relationship to pretreatment type," Environmental Science & Technology (2006) p. 2037-44, 40(6).

Kuntke, P. et al., "Ammonium recovery and energy production from urine by a microbial fuel cell," Water Research (2012) p. 2627-2636, 46(8).

Lee, S et al., "Comparison of fouling behavior in forward osmosis (FA) and reverse osmosis (RO)," Journal of Membrane Science (2010) p. 34-39, 365(1-2).

(56) References Cited

OTHER PUBLICATIONS

Li, D. et al., "Stimuli-responsive polymer hydrogels as a new class of draw agent for forward osmosis desalination," Chemical Communications (2011) p. 1710-1712, 47(6).
Li, Z. et al., "Flux patterns and membrane fouling propensity during desalination of seawater by forward osmosis," Water Research (2012) p. 195-204, 46(1).
Ling, M. M. et al., "Highly water-soluble magnetic nanoparticles as novel draw solutes in forward osmosis for water reuse," Industrial & Engineering Chemistry Research (2010) p. 5869-5876, 49(12).
Liu, H et al., "Electrochemically assisted microbial production of hydrogen from acetate," Environmental Science & Technology (2005) p. 4317-4320, 39(11).
Loeb, S. et al., "Large-scale power production by pressure-retarded osmosis using river water and sea water passing through spiral modules," Desalination (2002) p. 115-122, 143.
Logan, B. E. et al., "Microbial electrolysis cells for high yield hydrogen gas production from organic matter" Environmental Science & Technology (2008) p. 8630-8640, 42(23).
Logan, B. E., "Exoelectrogenic bacteria that power microbial fuel cells." Nature Reviews (2009) p. 375-381, 7.
Logan, B. E., "Scaling up microbial fuel cells and other bioelectrochemical systems," Applied Microbiology and Biotechnology (2010) p. 1665-1671, 85(6).
Logan, B.E., et al., "Microbial fuel cells: methodology and technology," Environmental Science and Technology (2006) p. 5181-5192, 40(17).
Low, S. C., "Preliminary studies of seawater desalination using forward osmosis," Desalination and Water Treatment (2009) p. 41-46, 7.
Luo, H. et al., "Concurrent desalination and hydrogen generation using microbial electrolysis and desalination cells," Environmental Science and Technology, (2011) 340-344, 45(1).
Luo, H. et al., "Microbial desalination cells for improved performance in wastewater treatment, electricity production, and desalination," Bioresource Technology (2012) p. 60-66, 105.
Masters, G.M., et al., "Introduction to environmental engineering and science," Third ed. Prentice-Hall, Inc., Upper Saddle River, New Jersey (2008).
Mathioulakis, E. et al., "Desalination by using alternative energy: review and state-of-art," Desalination (2007) p. 346-365, 203.
McCarty, P.L. et al., "Domestic Wastewater Treatment as a Net Energy Producer—Can This be Achieved?," Environmental Science Technology (2011) p. 7100-7106, 45(17).
McCutcheon, J.R. et al., "A novel ammonia-carbon dioxide forward (direct) osmosis desalination process," Desalination (2005) p. 1-11, 174(1).
McCutcheon, J.R. et al., "Influence of concentrative and dilutive internal concentration polarization on flux behavior in forward osmosis," Journal of Membrane Science (2006) p. 237-247, 284(1-2).
Mehanna, M., et al., "A microbial electrodialysis cell for simultaneous water desalination and hydrogen gas production," Environmental Science and Technology (2010) p. 9578-9583, 44(24).
Mehanna, M., et al., "Using microbial desalination cells to reduce water salinity prior to reverse osmosis," Energy & Environmental Science (2010) p. 1114-1120, 3(8).
Menicucci, J. et al., "Procedure for determining maximum sustainable power generated by microbial fuel cells," Environmental Science & Technology (2006) p. 1062-1068, 40(3).
Mi, B. et al., "Chemical and Physical aspects of Organic Fouling of Forward Osmosis Membranes," Journal Membrane Science, (2008) p. 292-302, 320.
Mi, B. et al., "Organic fouling of forward osmosis membranes: Fouling reversibility and cleaning without chemical reagents," Journal Membrane Science, (2010) p. 337-345, 348.
Mohanakrishna, G. et al., "Bio-electrochemical treatment of distillery wastewater in microbial fuel cell facilitating decolorization and desalination along with power generation," Journal of Hazardous Materials (2010) p. 487-94, 177(1-3).
Munoz, R. et al., "Algal—bacterial processes for the treatment of hazardous contaminants: A review," Water Research (2006) p. 2799-2815, 40(15).
Ng, H. Y. et al., "Performance of forward (direct) osmosis process: membrane structure and transport phenomenon," Environmental Science & Technology (2006) p. 2408-2413, 40(7).
Pant, D. et al., "A review of the substrates used in microbial fuel cells (MFCs) for sustainable energy production," Bioresource Technology (2010) p. 1533-1543, 101(6).
Park J. B. K. et al., "Wastewater treatment and algal production in high rate algal ponds with carbon dioxide addition," Water Science & Technology (2010) p. 633-639, 61(3).
Park, J. B. K. et al., "Wastewater treatment high rate algal ponds for biofuel production," Bioresource Technology (2011) p. 35-42, 102(1).
Park, J.S. et al., "An electrical impedance spectroscopic (EIS) study on transport characteristics of ion-exchange membrane systems," Colloid Interface Science (2006) p. 655-662, 300.
Phillip, W.A. et al., "Reverse draw solute permeation in forward osmosis: modeling and experiments," Environmental Science Technology (2010) p. 5170-5176, 44.
Phuntsho, S. et al., "A novel low energy fertilizer driven forward osmosis desalination for direct fertilization: Evaluating the performance of fertilizer draw solutions," Journal of Membrane Science (2011) p. 172-181, 375.
Qin, J. J. et al., "Experimental studies and modeling on concentration polarization in forward osmosis," Water Science and Technology (2010) p. 2897-904, 61(11).
Qu, Y., et al., "Simultaneous water desalination and electricity generation in a microbial desalination cell with electrolyte recirculation for pH control," Bioresource Technology (2012) p. 89-94, 106.
Quan, X. et al., "Air stripping of ammonia in a water-sparged aerocyclone reactor," Journal of Hazardous Materials (2009) p. 983-988, 170.
Rabaey, K. et al., "High current generation coupled to caustic production using a lamellar bioelectrochemical system," Environmental Science & Technology (2010) p. 4315-21, 44(11).
Rabaey, K. et al., "Microbial fuel cell cathodes: from bottleneck to prime opportunity," Water Science and Technology (2008) p. 655-659, 57(5).
Rabaey, K. et al., "Microbial fuel cells: novel biotechnology for energy generation," Trends in Biotechnology (2005) p. 291-298, 23(6).
Raventos, N. et al., "Effect of brine discharge from a desalination plant on macrobenthic communities in the NW Mediterranean," Marine Environmental Research (2006) p. 1-14, 62(1).
Rittmann, B.E., "Opportunities for renewable bioenergy using microorganisms," Biotechnology and Bioengineering (2008) p. 203-212, 100(2).
Rosenbaum, M. et al., "Light energy to bioelectrictiy: photosynthetic microbial fuel cells", Current Opinion in Biotechnology (2010) p. 259-264, 21(3).
Rozendal, R.A. et al., "Effects of membrane cation transport on pH and microbial fuel cell performance," Environmental Science and Technology (2006) p. 5206-5211, 40(17).
Rozendal, R.A. et al., "Towards practical implementation of bioelectrochemical wastewater treatment," Trends in Biotechnology (2008) p. 450-459, 26(8).
Schnoor, J.L., "ES&T's Best Papers of 2009," Environmental Science & Technology (2010) p. 2219-2219, 44(7).
Semiat, R., "Energy issues in desalination processes," Environmental Science & Technology (2008) p. 8193-201, 42(22).
Shannon, M.A., et al., "Science and technology for water purification in the coming decades," Nature (2008) p. 301-310, 452(7185).
Singer, E., "New technologies deliver in treating neurological diseases," Natural Medicines (2004) p. 1267, 10(12).
Strik, D.P. et al., "Renewable sustainable biocatalyzed electricity production in a photosynthetic algal microbial fuel cell (PAMFC)," Applied Microbiology and Biotechnology (2008) p. 659-668, 81(4).
Talaat, K. M., "Forward osmosis process for dialysis fluid regeneration," Artificial Organs (2009) p. 1133-5, 33(12).

(56) References Cited

OTHER PUBLICATIONS

Tanaka, Y., "Water dissociation in ion-exchange membrane electrodialysis," Journal of Membrane Science (2002) p. 227-244, 203(1-2).

Ter Heijne, A. et al., "A bipolar membrane combined with ferric iron reduction as an efficient cathode system in microbial fuel cells," Environmental Science & Technology (2006) p. 5200-5205, 40(17).

Ugwu, C.U. et al., "Photobioreactors for mass cultivation of algae," Bioresource Technology (2008) p. 4021-4028, 99(10).

Velasquez-Orta, S.B. et al., "Energy from algae using microbial fuel cells," Biotechnology and Bioengineering (2009) p. 1068-1076, 103(6).

Virdis, B.K. et al., "Simultaneous nitrification, denitrification and carbon removal in microbial fuel cells," Water Research (2010) p. 2970-2980, 44(9).

Vrouwenvelder, J. S. et al., "Diagnosis, prediction and prevention of biofouling of NF and RO membranes," Desalination (2001) p. 65-71, 139(1-3).

Wang, X. et al., "Use of carbon mesh anodes and the effect of different pretreatment methods on power production in microbial 20 fuel cells," Environmental Science & Technology (2009) p. 6870-6874, 43(17).

Xiao, L. et al., "Crumpled graphene particles for microbial fuel cell electrodes," Journal of Power Sources (2012) p. 187-192, 208.

Yang, Q. et al., "Dual-layer hollow fibers with enhanced flux as novel forward osmosis membranes for water production," Environmental Science & Technology (2009) p. 2800-2805, 43(8).

Yip, N. Y. et al., "High performance thin film composite forward osmosis membrane," Environmental Science & Technology (2010) p. 3812-8, 44(10).

Zhang, B. et al., "Integrated salinity reduction and water recovery in an osmotic microbial desalination cells," RSC Advances (2012) p. 3265-3269, 2.

Zhang, F. et al., "Effects of anolyte recirculation rates and catholytes on electricity generation in a liter-scale upflow microbial fuel cell," Energy & Environmental Science (2010) p. 1347-1352, 3.

Zhang, F. et al., "Integrating forward osmosis into microbial fuel cells for wastewater treatment, water extraction and bioelectricity generation," Environmental Science Technology (2011) p. 6690-6696, 45.

Zhang, F. et al., "Simultaneous nitrification and denitrification with electricity generation in dual-cathode microbial fuel cells," Journal of Chemical Technology & Biotechnology (2012) p. 153-159, 87(1).

Zhao, F. et al., "Challenges and constraints of using oxygen cathodes in microbial fuel cells," Environmental Science and Technology (2006) p. 5193-5199, 40(17).

Zhao, S. et al., "Recent developments in forward osmosis: opportunities and challenges," Journal of Membrane Science (2012) p. 1-21, 396.

Zou, S. et al., "The role of physical and chemical parameters on forward osmosis membrane fouling during algae separation," Journal of Membrane Science (2011) p. 356-362, 366(1-2).

PCT/US11/40473 International Search Report and Written Opinion dated Oct. 25, 2011, 7 pages.

Office Action from the US Patent and Trademark Office for U.S. Appl. No. 13/160,929 dated Sep. 11, 2014 (9 pages).

* cited by examiner

INTEGRATED PHOTO-BIOELECTROCHEMICAL SYSTEMS

CROSS-REFERENCE TO RELATED APPLICATION

This application claims the benefit of U.S. Provisional Patent Application No. 61/506,300, filed Jul. 11, 2011, the entire contents of which are herein incorporated by reference for all purposes.

BACKGROUND

Municipal wastewater treatment plants play a critical role in protecting human health and the environment, but the operation of such plants consumes an extensive amount of energy and the management of nutrients (e.g., nitrogen and phosphorus) remains a challenge. For instance, it has been estimated that approximately 3-5% of electricity consumed in the United States is consumed by water treatment and wastewater management infrastructure. As such, an ongoing challenge is the development of improved wastewater management with reduced energy demands and nutrient recovery.

A variety of technologies have been employed to produce fresh water from wastewater. One such technology is a microbial fuel cell (MFC) in which electricity may be harvested directly during microbial metabolism of organic matter. Specifically, in a MFC, organic matter (e.g., organic contaminants in wastewater) is metabolized by microbes in an anode chamber thus transferring electrons to the anode and liberating protons into the aqueous phase such that the electrons flow through a wire from the anode to a cathode to produce an electrical current. At the cathode, the electrons are accepted by a terminal electron acceptor (e.g., oxygen). Additionally, ion transport between the anode and cathode is needed to maintain proper change balance in the microbial fuel cell and to facilitate the generation of electricity. A microbial fuel cell, while removing organic contaminants from wastewater, does not remove other contaminants (e.g., salts, heavy metals, etc.) and thus further treatment is required to obtain fresh water.

A second such technology is algal bioreactors in which algae uptake nutrients such as nitrogen and phosphorus from water to support algal growth and fix carbon dioxide via photosynthesis to produce biomass and oxygen. Algal biomass may be converted into biofuels, e.g., biodiesel. Algal bioreactors, however, do not remove other contaminants (e.g., organic contaminants, heavy metals, etc.) from wastewater and thus further treatment is required to obtain fresh water.

SUMMARY OF THE INVENTION

This disclosure provides bioelectrochemical systems and treatment processes. Some bioelectrochemical systems include an anode, an algal bioreactor, and a cathode. The anode is at least partially positioned within an anode chamber containing a first aqueous reaction mixture including one or more organic compounds and one or more bacteria for oxidizing the organic compounds. The algal bioreactor contains a second aqueous reaction mixture including one or more nutrients and one or more algae for substantially removing the nutrients from the second aqueous reaction mixture. The cathode is at least partially positioned within the algal bioreactor.

Treatment processes according to embodiments of this disclosure include receiving at an anode chamber a first aqueous solution comprising one or more organic compounds. The anode chamber contains an anode and a plurality of bacteria for oxidizing the organic compounds to thereby produce an anode effluent. The treatment processes also include receiving at an algal bioreactor a second aqueous solution comprising one or more nutrients. The algal bioreactor contains a cathode and one or more algae for substantially removing the one or more nutrients from the second aqueous solution. Oxidizing the organic compounds causes electrons to flow from the anode to the cathode.

Other aspects of the invention will become apparent by consideration of the detailed description and accompanying drawings.

DETAILED DESCRIPTION

This disclosure provides integrated photo-bioelectrochemical (IPB) systems and methods for their use in the treatment of water.

The term "semipermeable membrane," as used herein, refers to any porous membrane made from organic or inorganic materials through which solvent molecules can pass but only some solute particles (and/or substances) can pass, and by which other solute molecules are blocked, as determined by size, charge, solubility, chemical properties, etc.

The term "cation exchange membrane," as used herein, refers to any semi-permeable membrane that substantially permits the passage of cations and substantially blocks anions.

The term "fresh water," as used herein, refers to water having less than 0.5 parts per thousand dissolved salts.

The term "wastewater," as used herein, refers to water containing organic material, particularly aqueous waste disposed from domestic, municipal, commercial, industrial and agricultural uses. For example, wastewater includes human and other animal biological wastes, and industrial wastes such as food processing wastewater.

The term "providing," as used herein, refers to any means of obtaining a subject item, such as an IPB system, or one or more components thereof, from any source, including, but not limited to, making the item or receiving the item from another.

Integrated Photo-Bioelectrochemical (IPB) Systems, Generally

Figure 1:
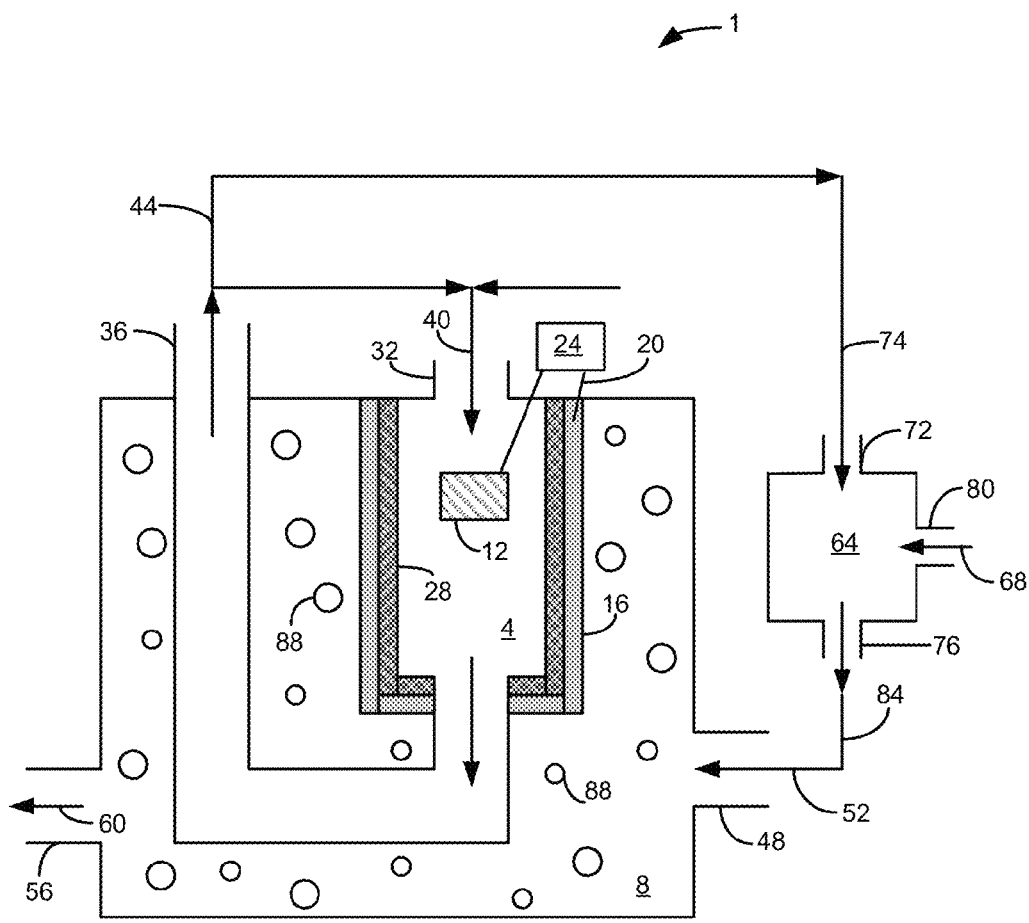
FIG. 1 is a schematic illustration of an exemplary integrated photo-bioelectrochemical (IPB) system.

FIG. 1 schematically illustrates an exemplary IPB system 1. The IPB system 1 may include an anode chamber 4, a cathode chamber 8, an anode 12 at least partially positioned with the anode chamber 4, a cathode 16 at least partially positioned within the cathode chamber 8, a conduit 20 for electrons (e.g., a wire) that connects the anode 12 and the cathode 16 and may be coupled to a power source or load 24, and a cation exchange membrane or material 28 positioned between the anode 12 and the cathode 16 and at least partially defining a shared wall between the anode and cathode chambers 4, 8. The anode chamber 4 may contain a one or more bacterial species for oxidizing organic compounds in solutions contained within the anode chamber 4. The cathode chamber 8 may contain one or more algal species for metabolizing carbon dioxide and nutrients (including, but not limited to, organic and inorganic nutrients) during photosynthesis, and for producing oxygen. As such, the cathode chamber 8 also may be referred to as an algal bioreactor 8.

The cation exchange membrane 28, as well as the walls it defines, may have any suitable shape, including, but not limited to, tubular, rectangular, square, elliptical, etc. In some embodiments, the cathode chamber 8 may at least partially surround the anode chamber 4 (or multiple anode chambers 4), and may include an inner wall defined by the cation exchange membrane 28 and an outer wall defined by another material, including, but not limited to, glass, metal, plastic, concrete, stone, and the like. In other embodiments, the anode chamber 4 may at least partially surround the cathode chamber 8, or the anode and cathode chambers 4, 8 may be positioned adjacent to one another. In some embodiments, the cathode 16 may be positioned adjacent to and in direct contact with the cation exchange membrane 28.

The anode chamber 4 may include an inlet 32 and an outlet 36 for receiving influent fluids 40 and discharging effluent fluids 44, respectively. Influent fluids 40 received by the anode chamber 4 (i.e., anode influent 40) and effluent fluids 44 discharged from the anode chamber 4 (i.e., anode effluent 44) may include aqueous solutions comprising one or more solutes, including, but not limited to, organic compounds and compositions (e.g., sugars, fats, bacteria, viruses, proteins, organic nitrites, organic nitrates, organic phosphates, etc.), inorganic compounds (e.g., ammonia, ammonium, nitrite, nitrate, phosphate, sulfides, etc.), dissolved gases (carbon dioxide, oxygen, nitrogen, hydrogen sulfide, etc.), and the like. Exemplary anode influent 40 may include, but is not limited to, untreated wastewater (e.g., municipal, industrial, or agricultural wastewater, etc.) and at least partially treated wastewater (e.g., effluent 44 discharged from and recycled back to the anode chamber 4, or effluent from an alternative wastewater treatment system). Exemplary anode effluent 44 may include at least partially treated wastewater, which may include organic compounds and compositions, inorganic compounds and dissolved gases that either were received through the anode inlet 32, or were formed in the anode chamber 4 during bacterial oxidation of organic compounds and compositions.

The algal bioreactor 8 likewise may include an inlet 48 for receiving influent fluids 52 and an outlet 56 for discharging effluent fluids 60. The influent fluid 52 received at the algal bioreactor 8 (i.e., bioreactor influent 52) may include, but is not limited to, anode effluent 44 and/or aqueous solutions formed via further processing of the anode effluent 44. In some embodiments, bioreactor influent 52 may be formed by mixing anode effluent 44 with other compounds or compositions, such as carbon dioxide and other algal nutrients, in a mixing chamber 64. For example, as shown in FIG. 1, anode effluent 44 and carbon dioxide from an external source 68 (such as a power plant or other external system involving combustion reactions) may be received and mixed together in a carbon dioxide mixing chamber 64, thereby forming an aqueous solution 84 having a higher concentration of carbon dioxide than the anode effluent 44, such as an aqueous solution that is saturated with carbon dioxide. This aqueous solution 84 then may be discharged by the mixing chamber 64, and received by the algal bioreactor 8 as bioreactor influent 52. The effluent fluid 60 subsequently discharged by the algal bioreactor 8 (i.e., bioreactor effluent 60) may include, but is not limited to, treated aqueous solutions and gases (e.g., oxygen, hydrogen, etc.) generated or released by the algae during photosynthesis.

It should be appreciated that the mixing chamber 64 may be in fluid communication with the outlet 36 of the anode chamber 4, the inlet 48 of the algal bioreactor 8, and one or more external sources. The mixing chamber 64 may include an inlet 72 for receiving an aqueous solution 44 from the anode chamber 4 (i.e., mixing chamber influent 74, or anode effluent 44), an outlet 76 for discharging aqueous solutions 84 to the algal bioreactor 8 (i.e., mixing chamber effluent 84, or bioreactor influent 52), and at least one additional inlet 80 for receiving compounds or compositions from an external source 68, such as carbon dioxide from a power plant. In some embodiments, the effluent fluid 84 of the mixing chamber 64 may be saturated with carbon dioxide, thereby providing a saturated bioreactor influent 52 that may promote or increase the growth of the algae in the algal bioreactor 8. In other embodiments, the mixing chamber effluent 84 (i.e., bioreactor influent 52) may be about 50% to 100% saturated with carbon dioxide, such as, about 55% to about 95%, about 60% to about 90%, about 65% to about 85%, and about 70% to about 80% saturated. Some mixing chamber effluents 84 may be at least about 50%, at least about 65%, at least about 70%, at least about 75%, at least about 80%, at least about 85%, at least about 90%, at least about 95%, at least about 98%, at least about 99%, or 100% saturated with carbon dioxide.

It should be appreciated that IPB systems 1 may have many different configurations, including those that are different from the one shown in FIG. 1. For instance, some IPB systems 1 may include multiple anode chambers 4 and/or multiple algal bioreactors 8 (i.e., cathode chambers 8). The anode and cathode chambers 4, 8, as defined by the cation exchange membrane 28 and/or other chamber walls (e.g., algal bioreactor 8), may be any suitable shape consistent with their functions. For instance, the algal bioreactor 8 and/or the cation exchange membrane 28 may be cylindrical or tubular such that one or more of the anode or cathode chambers 4, 8 is cylindrical or tubular. Finally, the volumes of the chambers 4, 8 defined by the cation exchange membrane 28 and algal bioreactor 8 can be varied to suit the specific needs for the source and product water that depend on the extent of algal growth, organic loading, and current densities.

In operation of the IPB system 1, anode influent 40 is delivered to and received by the anode chamber 4 via the anode inlet 32. The anode chamber 4 contains one or more bacteria for oxidizing the organic compounds, thereby producing electrons and protons. The electrons are transferred to the anode 12, and through the conductive circuit 20 to the cathode 16, where the electrons react with oxygen and protons to form water. This transport of electrons creates a charge differential between the anode 12 and the cathode 16. Concurrently, cations present in the reaction mixture in the anode chamber 4 pass through the cation exchange membrane 28 to the cathode chamber 8 (i.e., the algal bioreactor 8). Anode effluent 44 is discharged via the anode outlet 36 and is either recycled back to the anode inlet 32, or is delivered to and received by the mixing chamber inlet 72, or in embodiments lacking a mixing chamber 64, then directly by the bioreactor inlet 48.

The optional mixing chamber 64 receives the anode effluent 44 as mixing chamber influent 74, as well as compounds or compositions (e.g., carbon dioxide) from an external source 68 via the additional inlet 80, thereby mixing the mixing chamber influent 74 with the compounds and compositions 68 to form mixing chamber effluent 84. The mixing chamber effluent 84 is then discharged from the mixing chamber 64 via the mixing chamber outlet 76 and is received by the algal bioreactor inlet 48 as bioreactor influent 52.

At the algal bioreactor 8, the bioreactor influent 52 comes into contact with the one or more algae 88 contained in the algal bioreactor 8. The algae 88, when submitted to light conditions, undergo photosynthesis to remove nutrients (e.g., nitrogen and phosphorus) and carbon dioxide (i.e., fixation via photosynthesis). A byproduct of photosynthesis is oxygen, which, in turn, may be consumed as an electron acceptor at the cathode 16. Particularly, electrons transferred to the cathode 16 from the anode 12 react with the oxygen and protons to form water, thereby removing protons from the catholyte (i.e., algal growth medium) and raising the pH of the catholyte.

Until an IPB system 1 was tested, as described in the Examples below, it was unclear whether the reactions occurring at the cathode 16 would be sufficient to buffer the pH of the algal growth medium so as to maintain a pH adequate for supporting algal growth. It was equally possible that the bioreactor influent 52 would be too acidic (due to the high concentrations of carbon dioxide) to support algal growth, particularly during dark conditions when the algae was not photosynthesizing and consuming carbon dioxide. However, it was surprisingly found that, even during periods of alternating light and dark conditions (see the Examples below), the various reactions occurring in the algal bioreactor 8 and the anode chamber 4 cooperatively supported healthy algal growth. Further, this unexpected cooperative relationship between the MFC functionality and algal bioreactor functionality reduced energy and resource consumption by eliminating the need for aeration of the cathode 16 and the addition of a buffering agent to maintain an appropriate pH for algal growth while producing electricity and treating water as compared to conventional water treatment technologies.

Figure 12:
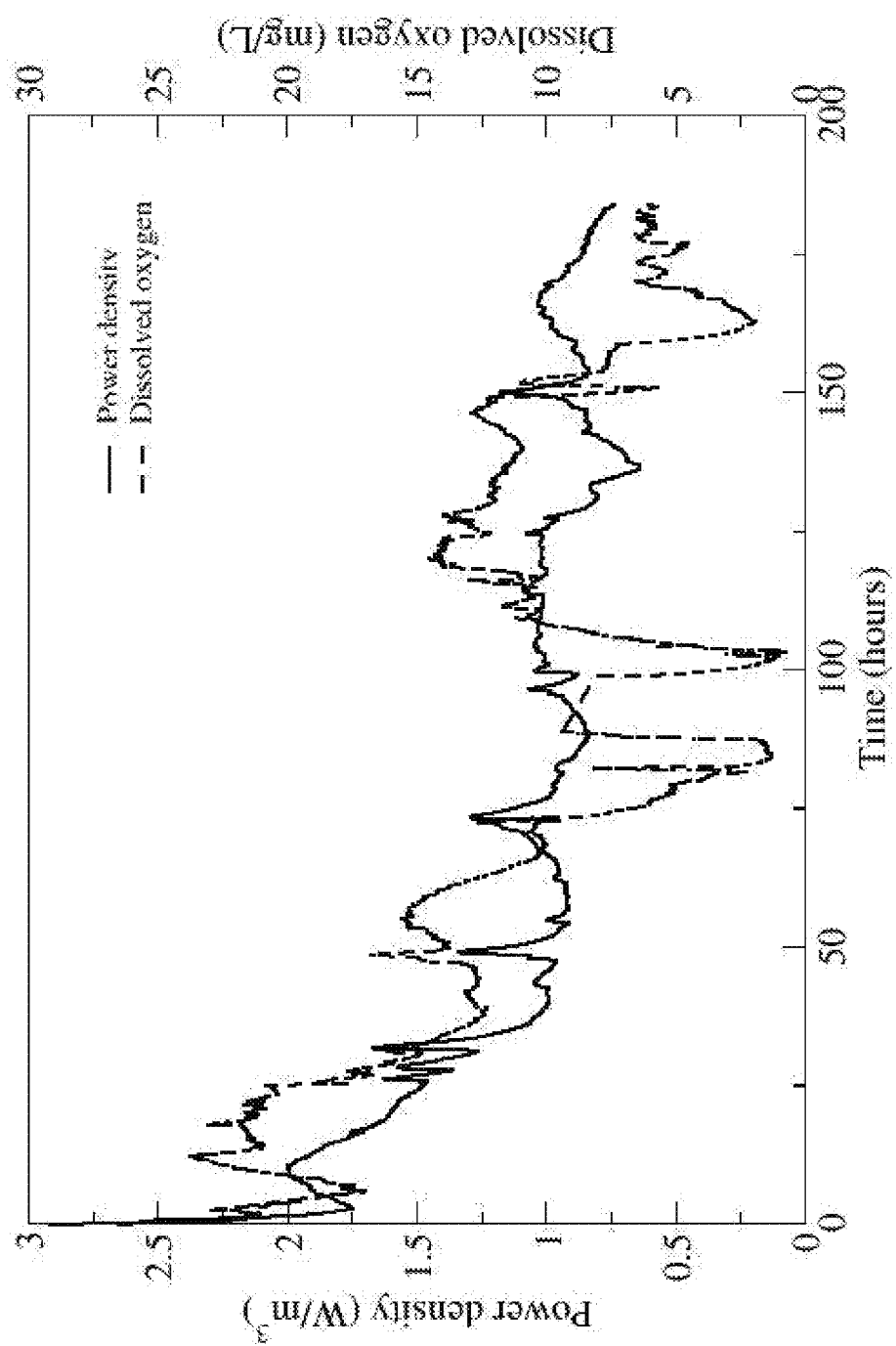
FIG. 12 is a graph depicting operation of an IPB system under extended illumination (i.e., under extended light conditions) as a function of time.
Figure 13:
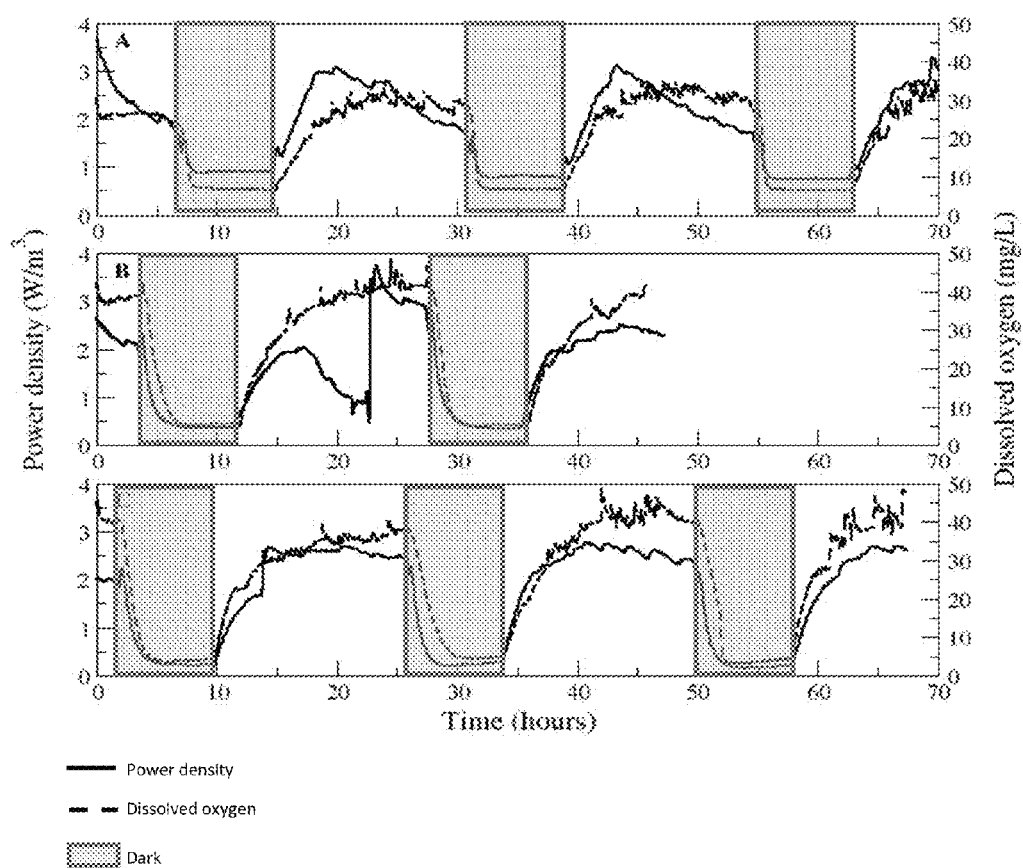
FIG. 13 is a graph showing operation of an IPB system with intermittent aeration (i.e., oxygenation) and light/dark cycling, as a function of time. Gray bars indicate dark conditions.

Surprisingly and unexpectedly, extended illumination of the algae did not increase oxygen production and thus power density (See FIG. 13). Rather, power density and the levels of oxygen dissolved in the catholyte decreased over time before reaching a stable level that was lower than the initial power density and dissolved oxygen levels. Instead, optimal performance was obtained by submitting the algal bioreactor 8 to alternating periods of light and dark conditions (i.e., periods of illumination followed by period of little or no illumination). Specifically, when periods of light and dark conditions were alternated in a manner similar to normal day/night conditions, the IPB system 1 provided regular periods of higher power density and dissolved oxygen levels that overlapped with periods of illumination (FIGS. 12 and 13).

Some IPB systems 1 may be upflow IPB systems. Though not shown in FIG. 1, the inlet 32 may be positioned at the bottom of the anode chamber 4 and the outlet 36 may be positioned at the top of the anode chamber 4. Similarly, the inlet 48 may be positioned at the bottom of the cathode chamber 8 and the outlet 56 may be positioned at the top of the cathode chamber 8. Such an upflow design provides numerous benefits over designs that lack an upflow design. For example, the upflow design facilitates mixing of fluids within the respective chambers due to turbulent diffusion. This mixing inhibits the formation of Nernst diffusion layers around the anode 12 and/or concentration gradients within the anode and cathode chambers 4, 8. The upflow design also allows for easier collection of gases produced during microbial degradation and algal growth. Finally, providing an upflow design for the anode chamber 4 helps ensure that the microbes within the anode chamber 4 remain in suspension. It should be appreciated that these same benefits may be achieved by upflow designs other than the one specifically discussed herein. For example, some IPB systems 1 may include an anode chamber 4 or cathode chamber 8 (i.e., algal bioreactor 8) comprising a fluid inlet positioned on or below a horizontal plane, and a fluid outlet positioned above the horizontal plane, where fluid flowing between the inlet and outlet flows substantially upwardly.

Some IPB systems 1 may include flow obstacles within the anode chamber 4 and/or cathode chamber 8 (i.e., algal bioreactor 8) to create turbulence and enhance mixing of liquids within the chambers (i.e., to facilitate mass transport). Exemplary flow obstacles may include, but are not limited to, nets, spiral channels, spacers, springs, and the like.

In some embodiments, a plurality of anode chambers 4 may be used in conjunction with a single algal bioreactor 8. For instance, an exterior wall may define the algal bioreactor 8 (i.e., the cathode chamber 8), and a plurality of cation exchange membranes 28 may define the outer wall(s) of a plurality of anode chambers 4, where each anode chamber 4 is at least partially surrounded and defined by its corresponding cation exchange membrane 28. In such embodiments, the cathode chamber 8 may contain one or a plurality of cathodes 16, such as cathodes 16 that are immediately adjacent to each cation exchange membrane 28. This type of arrangement may allow for multiple MFCs with a single algal bioreactor 8. More or less MFCs may be in the algal bioreactor 8, depending on the size of the algal bioreactor 8.

Electrodes

Electrodes included in the IPB systems disclosed herein are electrically conductive. Exemplary conductive electrode materials include, but are not limited to, carbon paper, carbon cloth, carbon felt, carbon wool, carbon foam, carbon mesh, activated carbon, graphite, porous graphite, graphite powder, graphite granules, graphite fiber, a conductive polymer, a conductive metal, and combinations of any of these. A more electrically conductive material, such as a metal mesh or screen, may be pressed against these materials or incorporated into their structure, in order to increase overall electrical conductivity of the electrode.

An anode and/or cathode may have any of various shapes and dimensions and may be positioned in various ways in relation to each other. For example, electrodes may be tubular, or cylindrical. Electrodes may be placed in a co-cylindrical arrangement, or they can be wound as flat sheets into a spiral membrane device. Electrodes also may be square, rectangular, or any other suitable shape. The size of the electrodes may be selected based on particular applications. For example, the size of the anode relative to the cathode may be selected based on cost considerations and considerations relating to performance. Moreover, where large volumes of substrates are to be treated in an IPB system, electrodes having larger surface areas or multiple electrodes may be used.

Typically, IPB system's anode provides a surface for transfer of electrons produced when microbes oxidize a substrate. As discussed below, anodophilic bacteria may be used that attach to and grow on the surface of the electrode, in which case the anode may be made of a material compatible with bacterial growth and maintenance. IPB system anodes may be formed of granules, mesh, or fibers of a conductive anode material, (e.g., such as graphite, carbon, metal, etc.) that provide a large surface area for contact with bacteria. In preferred embodiments, the anode may be a brush anode, such as a carbon brush anode.

IPB system cathodes either may be an air electrode (i.e., having at least one surface exposed to air or gasses) or may be configured to be immersed in liquid. Preferably for an IPB system, the cathode is configured to be immersed in liquid. A cathode preferably includes an electron conductive material. Materials that may be used for the cathode include, but are not limited to, carbon paper, carbon cloth, carbon felt, carbon wool, carbon foam, graphite, porous graphite, graphite powder, activated carbon, a conductive polymer, a conductive metal, and any combinations of these. In some embodiments, the cathode may comprise a catalyst, such as by mixing a catalyst with a polymer and a conductive material such that a membrane includes a conductive catalyst material integral with the membrane. For example, a catalyst may be mixed with a graphite or carbon coating material, and the mixture may be applied to a surface of a cation exchange material. Suitable catalysts may include, but are not limited to, metals (e.g., platinum, nickel, copper, tin, iron, palladium, cobalt, tungsten, alloys of such metals, etc.) as well as CoTMPP, carbon nanotubes and/or activated carbon, among others.

One or more additional coatings may be placed on one or more electrode surfaces. Such additional coatings may be added to act as diffusion layers, for example. A cathode protective layer, for instance, may be added to prevent contact of bacteria or other materials with the cathode surface while allowing oxygen diffusion to the catalyst and conductive matrix.

Membranes

Cation exchange membranes are semi-permeable membranes that substantially permit the passage of (i.e., are permeable to) cations and substantially block (i.e., are impermeable to) anions. Cation exchange membranes described herein are disposed between the cathode and anode chamber of IPB system, thereby forming a cation selective barrier there between. Cation exchange membranes may include, but are not limited to, ion-functionalized polymers exemplified by perfluorinated sulfonic acid polymers such as tetrafluoroethylene and perfluorovinylether sulfonic acid copolymers, and derivatives thereof; sulfonate-functionalized poly(phenylsulfone); and sulfonic acid functionalized divinylbenzene crosslinked poly(styrene), among others. Specific examples include NAFION, such as NAFION 117, and derivatives produced by E.I. DuPont de Nemours & Co., Wilmington, Del., and CMI-7000 cation exchange membranes from Membrane International Inc., NJ, USA, among others. Also suitable are other varieties of sulfonated copolymers, such as sulfonated poly(sulfone)s, sulfonated poly(phenylene)s, and sulfonated poly(imides)s, and variations thereof.

Bacteria

Bacteria that may be used with the IPB system of this disclosure may include, but are not limited to, anodophilic bacteria, and exoelectrogens, among others. Anodophilic bacteria refer to bacteria that transfer electrons to an electrode, either directly or by endogenously produced mediators. In general, anodophilic bacteria are obligate or facultative anaerobes. Examples of bacteria that may be used with the IPB system disclosed herein include, but are not limited to bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in the IPB system disclosed herein are described in Bond, D. R., et al., Science 295, 483-485, 2002; Bond, D. R. et al., Appl. Environ. Microbiol. 69, 1548-1555, 2003; Rabaey, K., et al., Biotechnol, Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; and Logan, B. E., et al., Trends Microbiol., 14 (12):512-518.

Anodophilic bacteria preferably are in contact with an anode for direct transfer of electrons to the anode. However, in the case of bacteria which transfer electrons through a mediator, the bacteria may be present elsewhere in the anode chamber and still function to produce electrons transferred to the anode.

Anodophilic bacteria may be provided as a purified culture, enriched in anodophilic bacteria, or enriched in a specified species of bacteria, if desired. A mixed population of bacteria also may be provided, including anodophilic anaerobes and other bacteria. Finally, bacteria may be obtained from a wastewater treatment plant. Regardless of the source, the bacteria may be used to inoculate the anode.

Algae

Algae that may be used with the IPB system of this disclosure may include, but are not limited to, microalgae, *Pseudokirchneriella subcapitata*, algae selected from the classes, Chlorophyceae (i.e., green algae), Bacillariophyceae (i.e., diatoms), Cyanophyceae (i.e., green-blue algae), and Chrysophyceae (i.e., golden algae), and algae selected from the species, *Chlorella, Chlamdomonas, Chaetoceros, Spirolina, Dunaliella*, and *Porphyridum*. Additionally, algae selected from the genera *Chlorella, Anabaena, Phormidium, Spirulina, Rhodococcu, Chiamydomonas*, and *Scenedesmus* may be used with the IPB system. Lastly, the IPB system may also be used with *Chlorella vulgaris, Scenedesmus acutus, Scenedesmus obliquus, Euglena gracilis, Chlorella, Homosphaera, Chlorella pyrenoidosa, Chlamydomonas reinhardtii, Scenedesmus subspicatus, Chlorella sorokiniana, C. sorokiniana, Pseudomonas migulae, Alcaligenes* sp., *Anabaena variabilis, Ralstonia basilensis*, and *C. pyrenoidosa*.

The algae may be in suspension in and/or on the surfaces of the algal bioreactor, allowing oxygen to be transferred to the cathode by diffusion. Alternatively, the algae may be in direct contact with the cathode. The algae may be provided as a purified culture or enriched in a specific species of algae, if desired. A mixed population of algae may also be provided. Finally, the algae may be obtained from any number of sources, not limited to, commercial companies that supply biological specimens and natural environments (e.g., ponds, etc.). Regardless of the source, the algae may be grown in the algal bioreactor.

Substrates

Substrates that may be used with IPB systems of this disclosure include substrates that are oxidizable by bacteria or biodegradable to produce a material oxidizable by bacteria. Bacteria can oxidize certain inorganic as well as organic materials. Inorganic materials oxidizable by bacteria are well-known in the art and illustratively include hydrogen sulfide. A biodegradable substrate is an organic material biodegradable to produce an organic substrate oxidizable by bacteria. Any of various types of biodegradable organic matter may be used as "fuel" for bacteria in an a IPB system, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by bacteria are known in the art. Illustrative examples of an organic substrate oxidizable by bacteria include, but are not limited to, monosaccharides, disaccharides, amino acids, straight chain or branched C1-C7 compounds including, but not limited to, alcohols and volatile fatty acids. In addition, organic substrates oxidizable by bacteria include aromatic compounds such as toluene, phenol, cresol, benzoic acid, benzyl alcohol and benzaldehyde. Further organic substrates oxidizable by bacteria are described in Lovely, D. R. et al., Applied and Environmental Microbiology 56:1858-1864, 1990. In addition, a substrate may be provided in a form which is oxidizable by bacteria or biodegradable to produce an organic substrate oxidizable by bacteria. Specific examples of organic substrates oxidizable by bacteria include glycerol, glucose, sodium acetate, butyrate, ethanol, cysteine and combinations of any of these or other oxidizable organic substances. Substrates also may include municipal and industrial wastewater, organic wastes and some inorganic compounds, including, but not limited to ammonium and sulfides.

Reaction Conditions within the Anode Chamber

An aqueous medium in an anode chamber of the IPB systems disclosed herein may be formulated to be non-toxic to bacteria in contact with the aqueous medium. Further, the medium or solvent may be adjusted to be compatible with bacterial metabolism, for instance, by adjusting its pH to be in the range between about pH 3-9, preferably about 5-8.5, inclusive, by adding a buffer to the medium or solvent if necessary, and/or by adjusting the osmolarity of the medium or solvent by dilution or addition of a osmotically active substance. Ionic strength may be adjusted by dilution or addition of a salt for instance. Further, nutrients, cofactors, vitamins and/or other such additives may be included to maintain a healthy bacterial population, if desired. Reaction temperatures may be in the range of about 10-40° C. for non-thermophilic bacteria, although IPB systems may be used at any temperature in the range of 0 to 100° C., inclusive by including suitable bacteria for growing at selected temperatures. However, maintaining a reaction temperature above ambient temperature may require energy input and/or harm algal growth in the algal bioreactor in which the MFC is at least partially positioned within, and as such, it may be preferred to maintain the reactor temperature at about 15-25° C., without input of energy and/or harm to algal growth.

In operation, reaction conditions, such as pH, temperature, osmolarity, and ionic strength of the medium in the anode compartment, may be variable, or may change over time.

Reaction Conditions within the Cathode Chamber

An aqueous medium in a cathode chamber of the IPB systems disclosed herein may be formulated to be non-toxic to algae in contact with the aqueous medium. Further, the medium or solvent may be adjusted to be compatible with algal metabolism, for instance, by adjusting its pH to be in the range of about pH 7-9, by adding a buffer to the medium or solvent if necessary, and/or by adjusting the osmolarity of the medium or solvent by dilution or addition of an osmotically active substance. Ionic strength may be adjusted by dilution or addition of a salt for instance. Further, nutrients, cofactors, vitamins, and/or other such additives may be included to maintain a healthy algae population, if desired. Reaction temperatures may be in the range of about 5-40 degrees Celsius, preferably about 16-27 degrees Celsius, inclusive, although IPB systems may used at any temperature in the range of 10 to 60 degrees Celsius, inclusive, by including suitable algae for growing at selected temperatures. However, maintaining a reaction temperature above ambient temperature may require energy input and/or harm bacterial growth in the anode chamber of the MFC, which is at least partially positioned within the algal bioreactor, and as such, it may be preferred to maintain the reactor temperature at about 15-25 degrees Celsius, without input of energy and/or harm to bacterial growth.

In operation, reaction conditions, such as pH, temperature, osmolarity, and ionic strength of the medium in the anode compartment, may be variable, or may change over time.

Embodiments of inventive compositions and methods are illustrated in the following examples. These examples are provided for illustrative purposes and are not considered limitations on the scope of inventive compositions and methods.

EXAMPLES

Example 1

Figure 2:
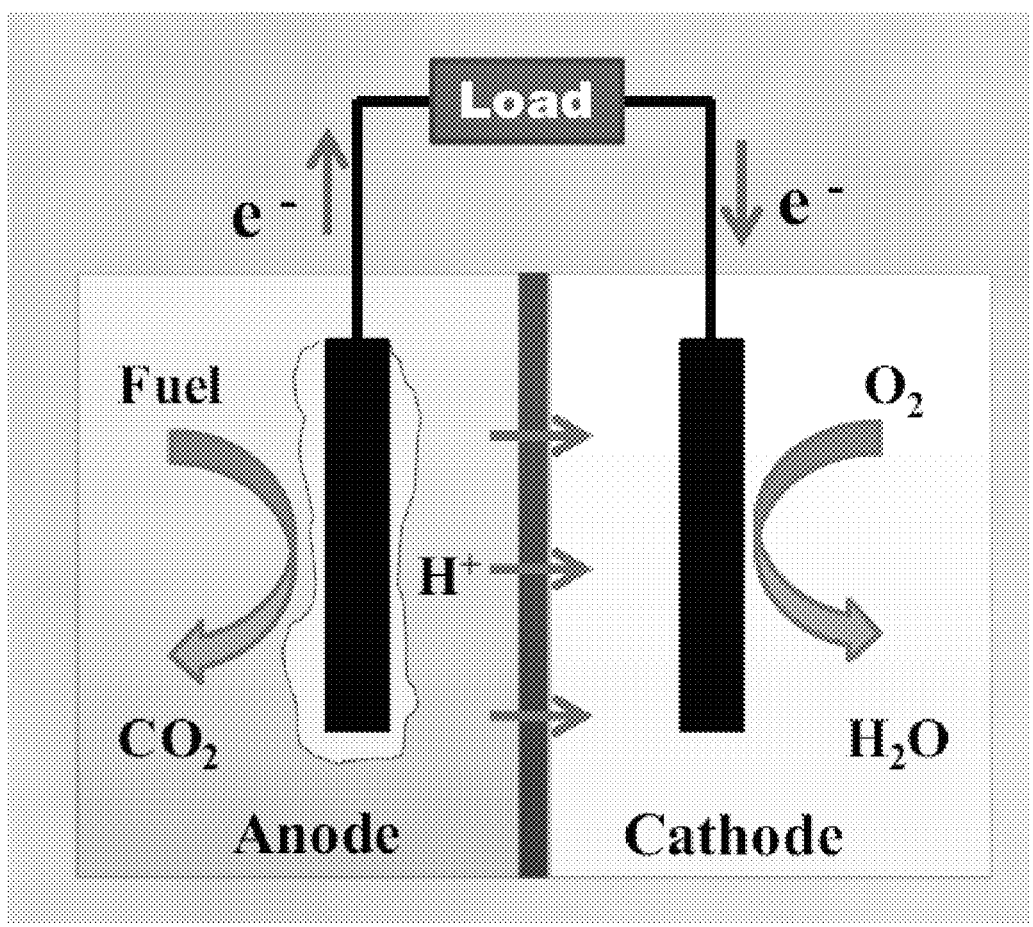
FIG. 2 is a schematic illustration of a microbial fuel cell (MFC).
Figure 3:
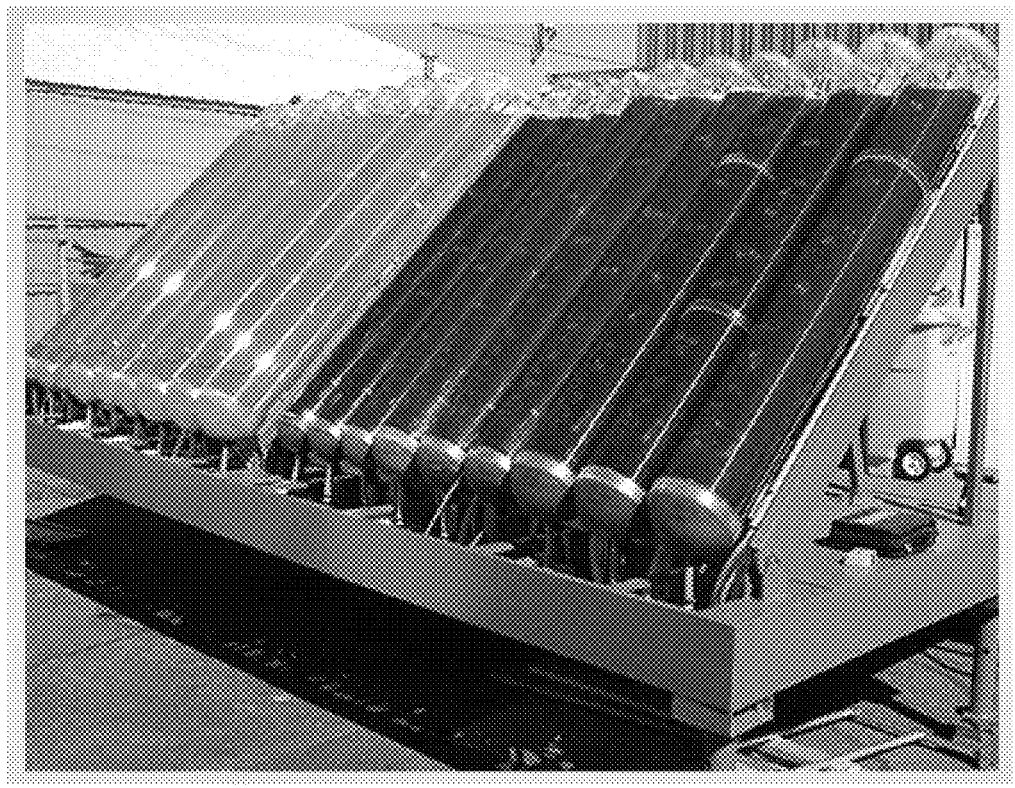
FIG. 3 is a photograph of an algal bioreactor.

Integration of Microbial Fuel Cells (MFCs) into Algal Bioreactors for Simultaneous Wastewater Treatment, Bioelectricity Generation, and Biomass Production Municipal wastewater treatment plants play a role in environmental protection but the operation of these facilities consumes intensive energy. MFCs are a promising and alternative approach to wastewater treatment as MFCs capture energy in the form of electricity, thereby reducing the overall energy requirement for the treatment of water (FIG. 2). MFCs, however, cannot efficiently remove nutrients such as nitrogen (N) and phosphorus (P) from water. Algal treatment of wastewater can be used to remediate wastewater, especially via the removal of nutrients and heavy metals from the water. Specifically, algal bioreactors consume nutrients such as nitrogen and phosphorus during algal growth, resulting in the production of algal biomass, which in turn can be used to make biodiesel (FIG. 3).

Figure 4:
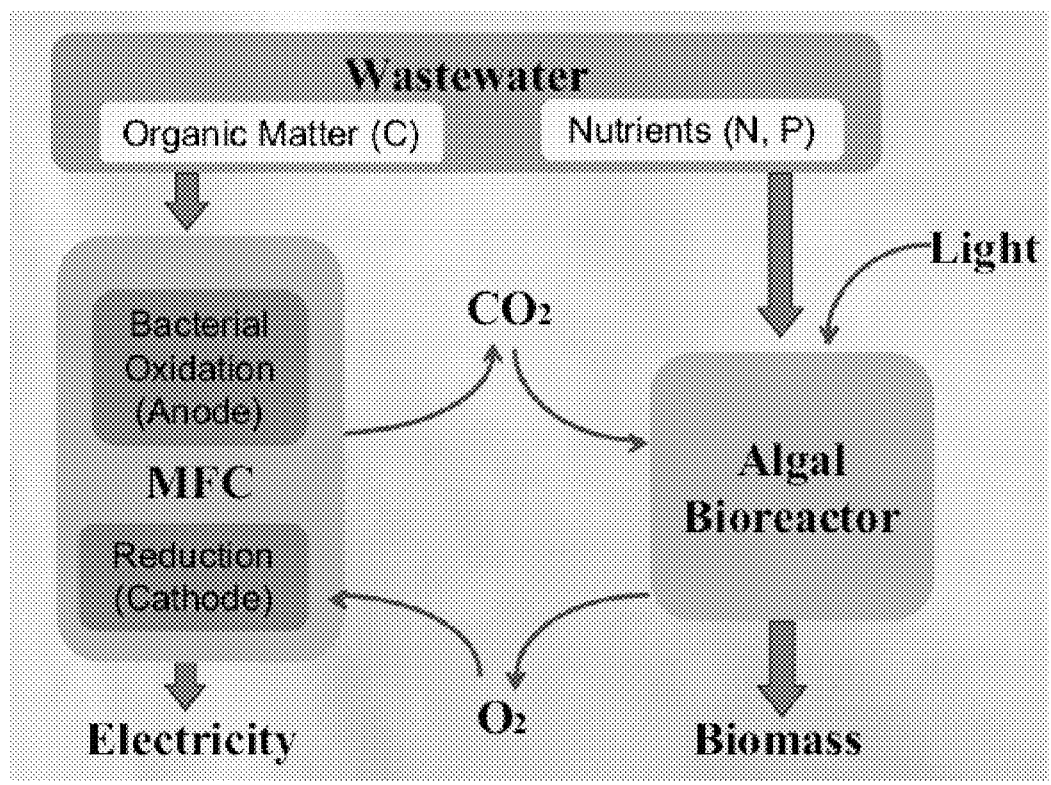
FIG. 4 is a schematic illustration of an exemplary IPB system.

MFCs were integrated into an algal bioreactor to develop a novel wastewater treatment system to achieve the treatment of both organic wastes and nutrients (e.g., nitrogen and phosphorus) within wastewater, reduce energy consumption during water treatment, and produce electricity and algal biomass. A schematic of such a treatment process is shown in FIG. 4. In the IPB system, wastewater is fed into the MFC, where organic contaminants are converted into electricity. The effluent leaving the anode chamber of the MFC is then discharged into the algal bioreactor to remove the remaining nutrients in the wastewater. Algae growing in the algal bioreactor removes the nutrients from the wastewater before the water leaves the algal bioreactor.

An MFC was installed inside an algal bioreactor, thereby allowing the algae to produce oxygen via photosynthesis. The oxygen was used in the cathode reaction of the MFC, thereby reducing the need for aeration in the cathode chamber of the MFC, and reducing energy consumption during the treatment of water by the MFC. Concurrently, the cathode reaction in the MFC consumed oxygen and protons in a manner that buffered the solution in the algal bioreactor to maintain a pH adequate for supporting algal growth, despite the addition of substantial concentrations of carbon dioxide and when alternating between periods of light and dark conditions. As such, the MFC and the algal bioreactor were cooperatively linked to each other and allowed for the treatment of both organic wastes and nutrients, a reduction in energy consumption, and the production of electricity and algal biomass.

A. Materials and Methods

1. MFC Setup

Figure 5:
FIG. 5 is a photograph of an exemplary IPB system.

As shown in FIG. 5, a tubular air-cathode MFC with a volume of 300 mL (liquid volume is 250 mL) was inserted into a glass beaker filled with a solution containing the algae *Pseudokirchneviella subcapitata* DYV, until the cathode electrode was at least partially immersed in the algae solution. A carbon brush was used as an anode electrode and the cathode electrode was a carbon cloth with 0.5 mg Pt/cm$^2$ as a catalyst. During the startup period of the MFC, the solution in the anode chamber contained acetate, mineral, and nutrients while a solution containing phosphate buffer (pH about 7) was applied to the cathode. Air was also supplied to the algal bioreactor to provide oxygen to the cathode. The anode was also inoculated with anaerobic sludge.

2. Operation of the Integrated System

During normal operation of the system, the cathode influent was the anode effluent.

B. Results

Figure 6:
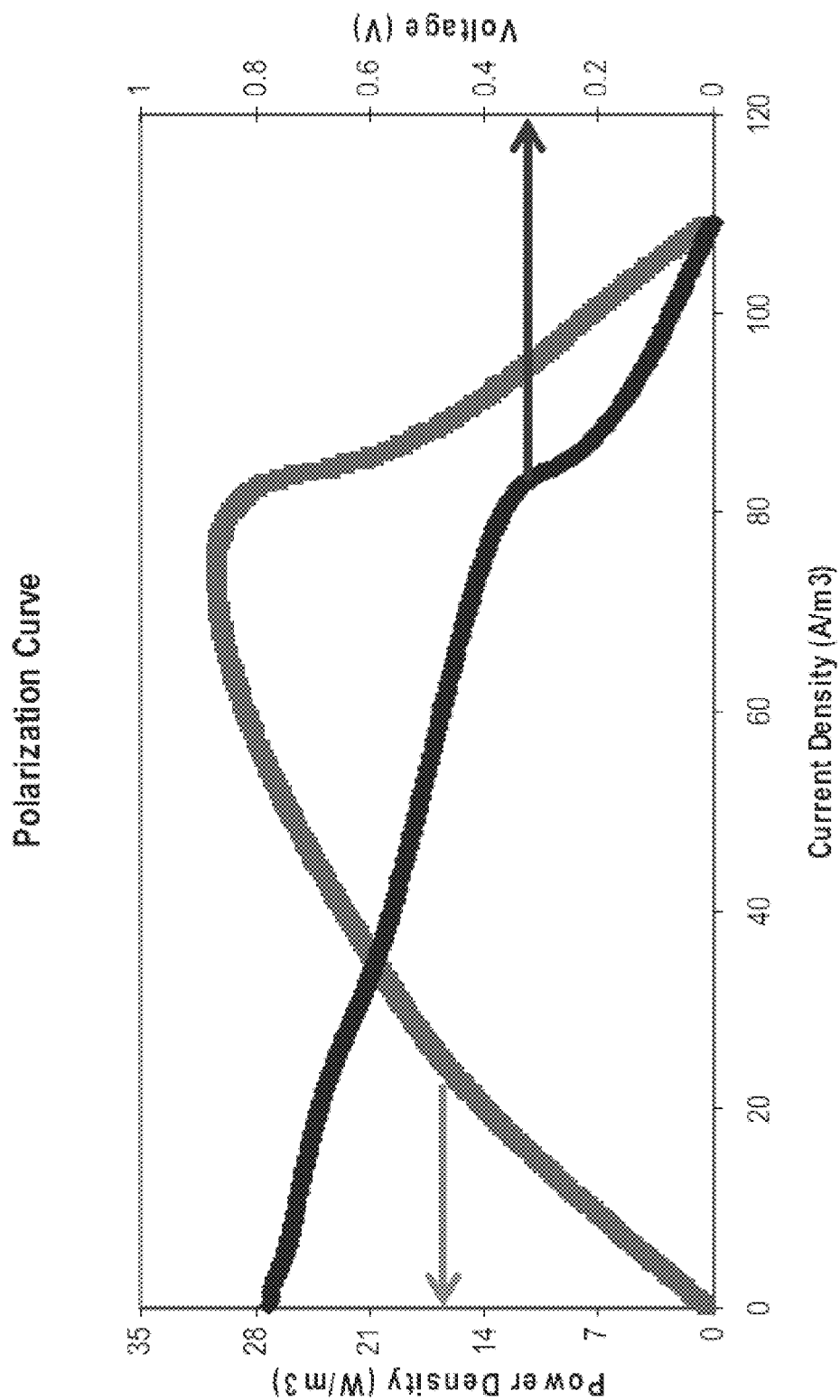
FIG. 6 is a graph showing a polarization curve from an IPB system.
Figure 7:
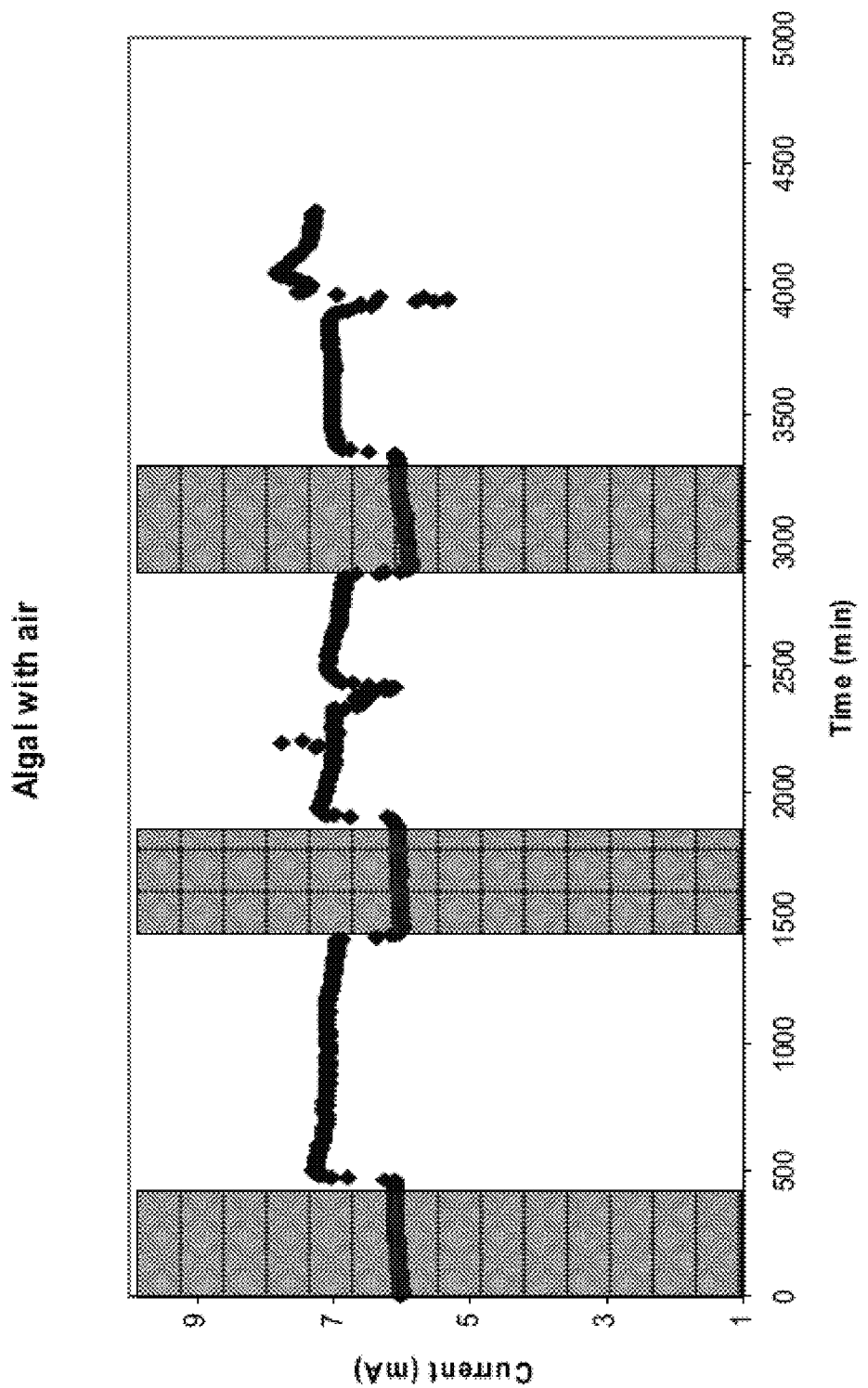
FIG. 7 is a graph showing current generation from an IPB system, as a function of time. The vertical gray bars indicate dark conditions.
Figure 8:
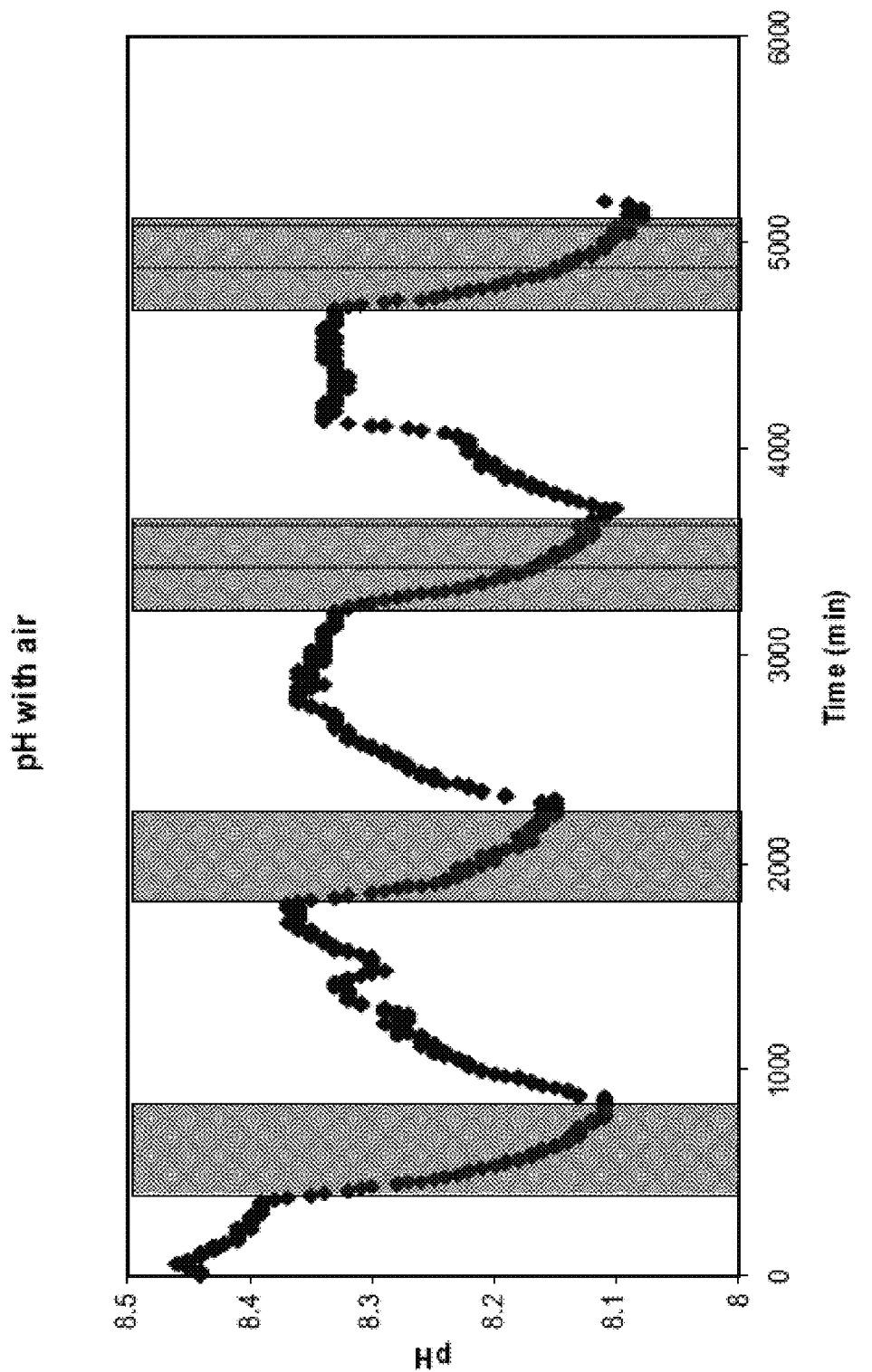
FIG. 8 is a graph showing the variation of pH in an IPB system, as a function of time. The vertical gray bars indicate dark conditions.

During operation of the IPB system, an active air supply was provided to the cathode and the chemical oxygen demand (COD) removal was 95.97%. The maximum power density was 3.0 W/m$^3$ (FIG. 6, power density and voltage are represented by the gray and black lines, respectively). The current generation was 7 mA under light conditions and 6 mA under dark conditions (FIG. 7, vertical gray bars represent dark conditions). The pH variation in the algal growth medium (i.e., the catholyte) increased under light conditions (i.e., became more basic) and decreased under dark conditions (i.e., became more acidic) (FIG. 8, vertical gray bars represent dark conditions).

Figure 9:
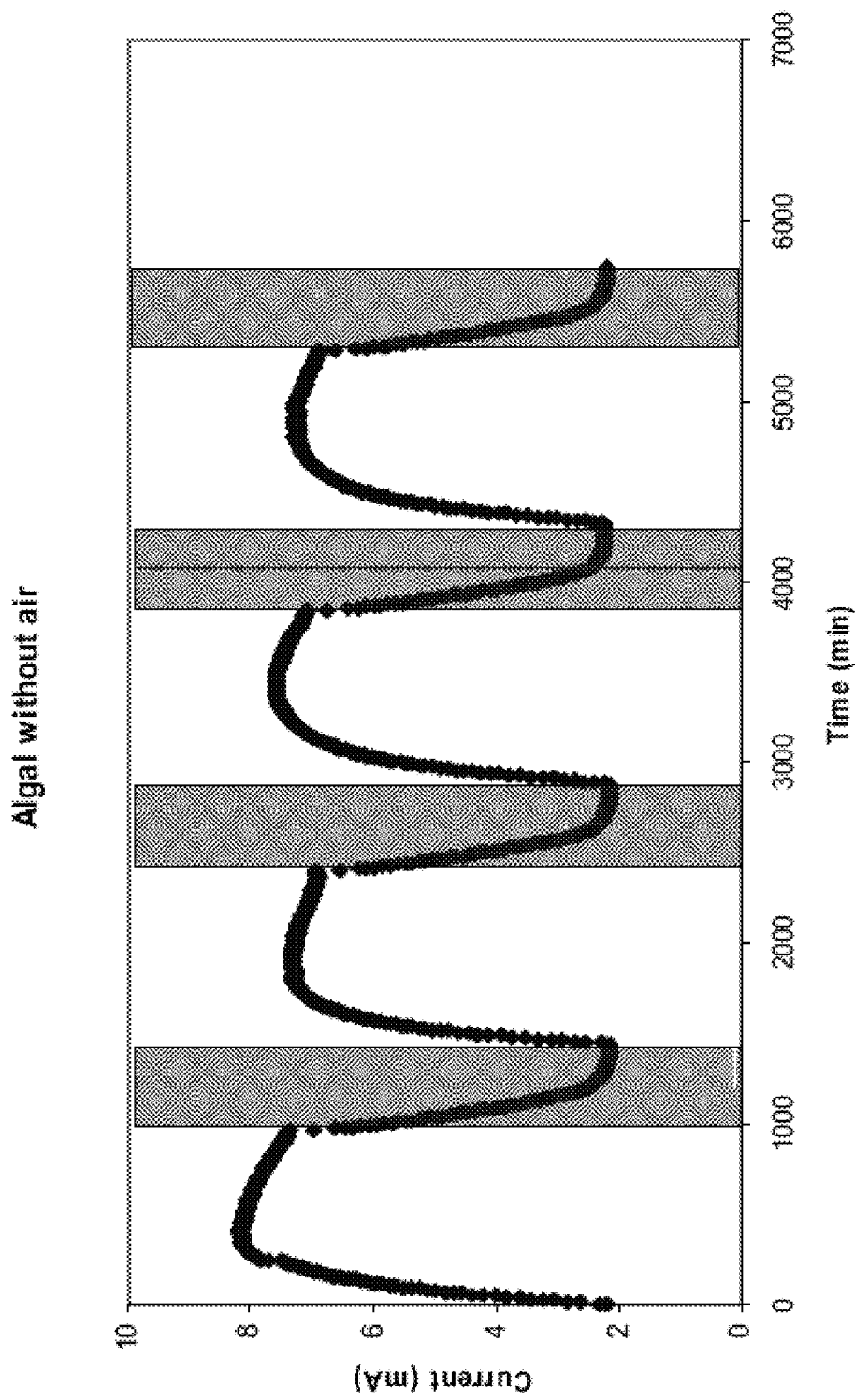
FIG. 9 is a graph showing current generation from an IPB system, as a function of time. The vertical gray bars indicate dark conditions.

If the integrated system was operated without an active air supply to the cathode, the COD removal was 97.38%. Additionally, the current generation was 7.5 mA under light conditions and 2 mA under dark conditions (FIG. 9, vertical gray bars represent dark conditions).

C. Summary

The above data shows that current generation is higher under light conditions (e.g., daylight) than under dark conditions (e.g., night time). Furthermore, providing an active air supply to the cathode increased the current generation during dark conditions as compared to not providing an active air supply to the cathode (FIGS. 7 and 9, vertical gray bars represent dark conditions).

Example 2

Nutrient Removal Through Energy Production in an Integrated Photo-bioelectrochemical System This study examined the performance of an IPB system under the influence of illumination (i.e., under light conditions) and under aeration. The dissolved oxygen (DO), pH, and temperature in the cathode chamber (i.e., algal bioreactor) of the MFC were monitored. The removal of organics and nutrients (nitrogen (N) and phosphorus (P)) was examined. The microbial communities in the biofilm attached to the cathode electrode were analyzed. These microbial communities may include bacteria that are able to grow on or attach to the cathode. Particularly, these bacteria may perform nitrification (i.e., converting ammonia to nitrate) and/or oxidize any organic compounds present or remaining in the algal bioreactor (e.g., heterotrophic bacteria). Additionally, the planktonic cells in the cathode compartment (i.e., algal bioreactor) were also analyzed.

A. Materials and Methods

1. IPB System Setup

The IPB system consisted of a single-chamber tubular MFC installed in a glass beaker, which functioned as both the cathode compartment and algal bioreactor. The MFC was constructed based on a cation exchange membrane tube (CEM, Ultrex CMI7000, Membranes International, Inc., Glen Rock, N.J.) that had a diameter of 5 cm and a height of 22 cm, resulting in an anode liquid volume of 300 mL. A 20 cm long carbon brush (Gordon Brush Mfg. Co., Inc., Commerce, CA) was used as the anode electrode. Before use, the carbon brush electrode was pretreated by immersing it in acetone overnight and being heated at 450 degrees Celsius for 30 min. The cathode electrode that wrapped the CEM tube was a layer of carbon cloth with Pt/C as the catalyst. To coat the Pt catalyst onto the cathode electrode, the powder of Pt/C was mixed with Nafion solution and applied to the carbon cloth surface with a brush with a final loading rate of about 0.5 mg Pt/cm$^2$. The anode and cathode electrodes were connected by copper wires to an external circuit across a 100 Ohm resistance. The glass beaker that held the MFC had a diameter of 10 cm and height of 29 cm, with a liquid volume of 1700 mL. Three light bulbs installed around the cathode provided the illumination for algal growth (32 W, 120 V, Energy Wiser, Bulbrute Industries, Inc., China) on a 16-hour (h) on/8-hour (h) off cycle.

2. Operating Conditions

The IPB system was continuously operated treating artificial wastewater at an ambient temperature. The anode compartment was inoculated with anaerobic sludge from a local municipal wastewater treatment plant (South Shore, Milwaukee, Wis., USA). The cathode compartment was initially inoculated with the green algae *Pseudokirchneriella subcapitata*. The artificial wastewater with 2.48 mS/cm conductivity contained (per L of tap water): sodium acetate, 0.35 g; $NH_4Cl$, 0.2 g; NaCl, 0.5 g; $MgSO_4$, 0.015 g; $CaCl_2$, 0.02 g; $NaHCO_3$, 0.6 g; $KH_2PO_4$, 0.027 g and 1 mL/L trace elements (Xiao et al. 2012). This solution was fed into the anode chamber of the MFC at a flow rate of 0.4 mL/min (with an anolyte recirculation rate of 30 mL/min), resulting in a hydraulic retention time (HRT) of 12.5 hours in the anode compartment. The effluent of the anode flowed into a 500-mL beaker where $CO_2$ was bubbled to provide inorganic carbon for algal growth, and then pumped into the cathode compartment of the MFC at the same flow rate of the anode feeding. The catholyte was mixing by a magnetic stirrer.

3. Measurement and Analysis

The cell voltage was recorded every 5 min by a digital multimeter (2700, Keithley Instruments, Inc., Cleveland, Ohio, USA). Power density and current density was based on the anode chamber liquid volume, according to a previous study (Xiao et al. 2012). The chemical oxygen demand (COD) and the concentrations of soluble ammonium nitrogen, nitrite nitrogen, nitrate nitrogen, and phosphorus (P) were measured according to the manufacturer's instruction, using a DR/890 datalogging colorimeter (Hach Company, Loveland, Colo., USA). The pH, temperature, and dissolved oxygen (DO) were measured using a 556 MPS handheld multiparameter instrument (YSI Incorporated, Yellow Spring, Ohio, USA). The concentration of algal mass was measured by a 1100 spectrophotometer (Unico, Dayton, N.J., USA).

B. Results

1. Performance of the IPB System

Figure 10:
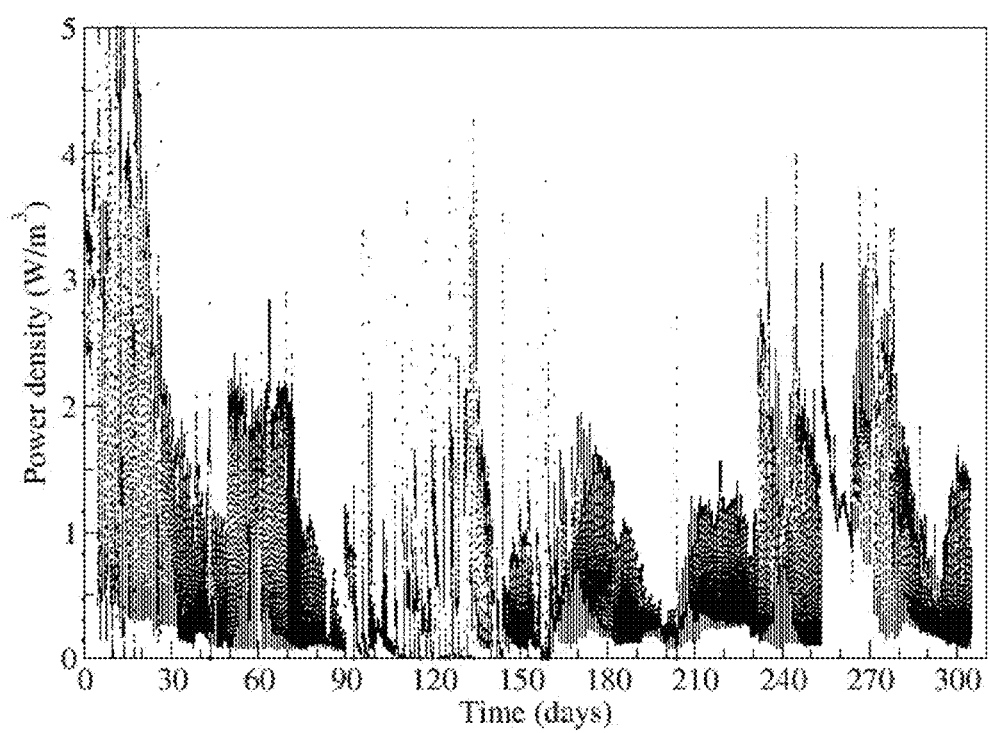
FIG. 10 is a graph showing the power density of an IPB system, as a function of time.
Figure 11:
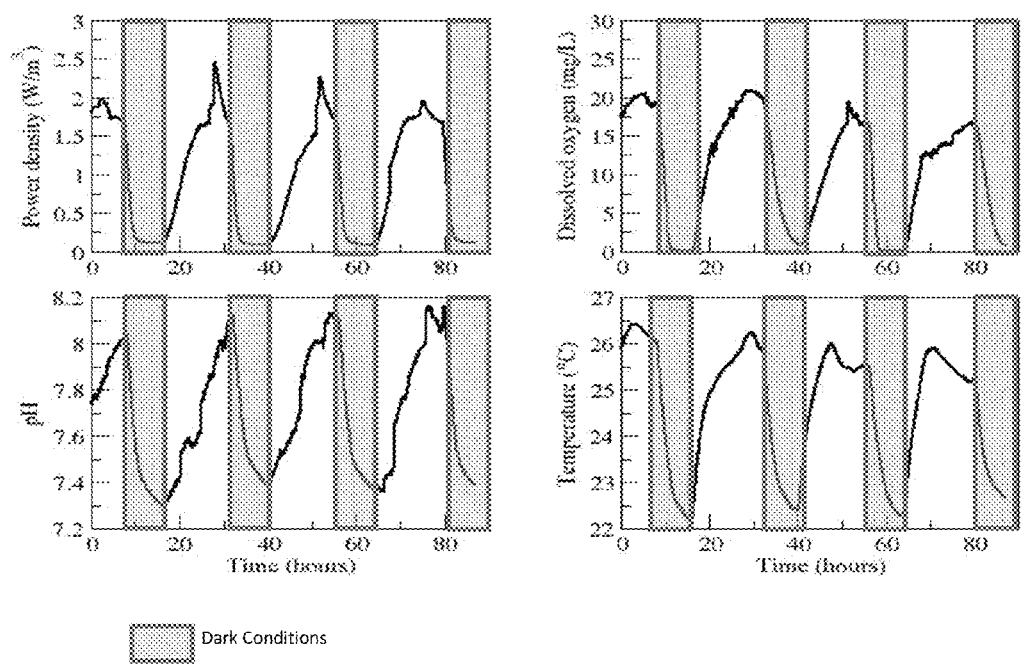
FIG. 11 is a series of four graphs showing operation of an IPB system with light/dark cycling, including: (upper left graph) a plot of power density as a function of time; (lower left graph) a plot of pH as a function of time, (upper right graph) a plot of dissolved oxygen as a function of time; and (lower right graph) a plot of temperature as a function of time. Gray bars indicate dark conditions.

The IPB system was operated for more than 300 days (FIG. 10). In the first 30 days, the COD concentration of the anode influent was 624 mg/L, which was reduced to about 266 mg/L for the following period. More detailed information is shown in FIG. 11 (vertical gray bars represent dark conditions) for a period of 4 days, as an example. The electricity produced by the MFC exhibited a day-night profile, affected by illumination (16-h on and 8-h off), with a peak power density of $2.18\pm0.21$ W/m$^3$ while under illumination (FIG. 11, upper left graph). Because no aeration was provided during this period, the cathode reaction relied on the dissolved oxygen (DO) produced by the algae in the cathode compartment. Similar to current generation, the DO concentration varied on a day-night base, and under illumination, the concentration of DO reached 20 mg/L (FIG. 11, upper right graph), which was more than twice the saturated DO in deionized (DI) water at the same temperature that was observed in another algal bioreactor (Park and Craggs 2010). When the light was turned off, the DO gradually dropped to almost 0 mg/L, resulting in a power density of $0.10\pm0.01$ W/m$^3$ in the dark conditions. The pH of the catholyte (i.e., algal growth media) varied between 7.3 and 8.2 (FIG. 11, lower left graph), a result of the combined effect of oxygen reduction at the cathode and $CO_2$ buffering. The MFC cathode reaction could easily elevate the pH of the catholyte to above 11 and the anode effluent saturated with $CO_2$ had a low pH of 4-5. When the low pH anode effluent entered the cathode compartment, the oxygen reduction elevated the pH to a level that is appropriate for algal growth (pH of about 7-9 (Park et al. 2011)). The low pH of the anode effluent also benefited the cathode reaction. The addition of $CO_2$ not only provides a carbon source for algal growth, but also buffers the catholyte and thus eliminates the use of an expensive buffer solution that is not practical for large scale application (Formero et al., 2010; Fan et al., 2007). A potential source of $CO_2$ is flue gas if the MFC system can be installed adjacent to power plants. The illumination also changed the temperature of the catholyte (i.e., algal growth media) with an increase from about 22 degrees Celsius to about 26 degrees Celsius under the light conditions (FIG. 11, lower right graph). Such an increase in temperature could help algal growth because algae prefer a warm condition (Park et al. 2011).

The IPB system effectively reduced the concentrations of both organics and nutrients. The anode removed 93% of solution COD (SCOD) and decreased the SCOD concentration from 266.7 mg/L to 22.0 mg/L$\pm$13.7 mg/L, which was further reduced to 20.2 mg/L$\pm$2.9 mg/L by the cathode (Table 1). The average coulombic efficiency was 7.7% and the average coulombic recovery was 7.2%. Almost all of the ammonia (98%) was removed through either algal growth or nitrification. It is interesting to note that the anode effluent contained less than half of the initial ammonium. Because anaerobic ammonia oxidation has not been well demonstrated in the anode chamber of an MFC (He et al. 2009), we believed that the ammonium loss was due to ammonium transport into the cathode compartment through the cation exchange membrane (Kuntke et al. 2012). Nitrification was expected to occur in the cathode chamber because of the presence of both dissolved oxygen and bacteria capable of performing nitrification (i.e., converting ammonia to nitrate). Denitrification, on the other hand, would be very limited because of the dissolved oxygen. Algal growth prefers ammonia to nitrate (Chan et al. 1979), and thus nitrate accumulated in the catholyte. The removal of total nitrogen by the IPB system was about 63%. The concentration of phosphorus was decreased by 82% when the feed solution flowed through the IPB system, including a 27% reduction in the anode compartment likely due to bacterial cell synthesis and a 55% reduction in the cathode compartment because of algal growth. The final phosphorus concentration was $1.1\pm0.2$ mg/L, which is close to the discharge limit of 1.0 mg/L, but the stricter limit of below 0.1 mg/L may be a challenge for the IPB system.

TABLE 1

The concentrations of COD and nutrients in the IPB system.

| | SCOD (mg/L) | $NH_3$—N (mg/L) | $NO_3$—N (mg/L) | $NO_2$—N (mg/L) | $PO_4$—P (mg/L) | Biomass (mg/L) |
|---|---|---|---|---|---|---|
| Anode Influent | 266.7 | 52.3 | N/A | N/A | 6.2 | N/A |
| Anode Effluent | 22.0 ± 13.7 | 20.3 ± 0.5 | N/A | N/A | 4.5 ± 0.2 | N/A |
| Cathode Effluent | 20.2 ± 2.9 | 0.7 ± 0.8 | 19.3 ± 1.8 | N/A | 1.1 ± 0.2 | 128 ± 36 |

2. Extended Illumination

In order to examine the influence of illumination on the IPB system, the illumination time was extended to 24 hours per day. The power density produced by the system is shown in FIG. 12. The power density gradually decreased with time and reached a stable level after 2 days, which was only about half of the initial level. The DO concentration also showed a similar trend, which proved that a decrease in the photosynthetic $O_2$ production rate was the main reason for the low power density. This result indicated that continuous illumination can generate photo-oxidative damage to algal cells. Some experiments have also showed that some algae species, like *coccolithus huxleyi*, *Chlorella*, and *Euglena*, which normally divide in the dark, could be strongly inhibited by a high intensity continuous illumination. It has been proposed that photosynthesis and cell division are to some extent mutually exclusive. Another reason for the decreasing power density is that nitrification is promoted in the cathode chamber. The highest concentration of nitrate in the effluent leaving the cathode chamber during this period was 32.2 mg/L $NO_3$—N, which was 1.67 times the concentration of $NO_3$—N in the cathode effluent when day/night cycling occurred (Table 1). These data indicated that algae are less competitive at nitrification than bacteria under continuously high intensive illumination.

3. Intermittent Aeration and Energy Balance

We investigated whether it is feasible to add aeration at night when the DO was low due to the absence of algal photosynthesis. Aeration improved power production at night (FIG. 13, vertical gray bars represent dark conditions); however, the DO concentration with aeration was much lower than that with algal photosynthesis, indicating that using algal growth to provide oxygen to the cathode of the MFC is a promising approach. The electric energy produced was about 0.026 kWh/$m^3$ treated water per day. According to a previous publication, the energy consumption to operate such an MFC was estimated to 0.02 kWh/$m^3$ treated water (Kim et al. 2011). In addition, the IPB system produced algal biomass of 128±36 mg/L (or 43.37 mg/L/day), which was comparable with another algal bioreactor fed on wastewater (Ugwu et al. 2008). This algal biomass represents an energy content of 0.269 kWh/$m^3$, assuming it contains 20% oil, which can be converted to biodiesel ($E_{biodiesel}$ is about 37800 MJ/ton) (Chisti 2007) (Chisti 2008).

C. Summary

A long-term study (over one year) of the IPB system was conducted, and promising results were obtained. The IPB system removed more than 92% of COD and >98% of nitrogen in the form of ammonium. The total nitrogen removal was about 62%, given the nitrate remaining in the effluent from the cathode chamber (i.e., algal bioreactor). The IPB system also removed more than 80% of phosphorus. The peak power output was about 2 W/$m^3$ and the coulombic efficiency was 7.7%. The IPB system produced 128 mg biomass/L. It was found that extended periods of continuous illumination decreased algal activity and thus biomass production.

The systems, compositions and methods disclosed herein are not limited in their applications to the details described herein, and are capable of other embodiments and of being practiced or of being carried out in various ways. The phraseology and terminology used herein is for the purpose of description only, and should not be regarded as limiting. Ordinal indicators, such as first, second, and third, as used in the description and the claims to refer to various structures, are not meant to be construed to indicate any specific structures, or any particular order or configuration to such structures. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention.

Recitation of ranges of values herein are merely intended to serve as a shorthand method of referring individually to each separate value falling within the range, unless otherwise indicated herein, and each separate value is incorporated into the specification as if it were individually recited herein. For example, if a parameter is described as having a range from 1 to 50 units, it is intended that values such as 2 to 40 units, 10 to 30 units, 1 to 3 units, etc., are expressly enumerated in the specification. These are only examples of what is specifically intended, and all possible combinations of numerical values between and including the lowest value and the highest value enumerated are to be considered to be expressly stated in this application.

Any patents or publications mentioned in this specification are incorporated herein by reference to the same extent as if each individual publication is specifically and individually indicated to be incorporated by reference. Further, no admission is made that any reference, including any non-patent or patent document cited in this specification, constitutes prior art. Unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

REFERENCES

The following references are herein incorporated by reference in their entireties for all purposes.

Achilli, A.; Cath, T. Y.; Marchand, E. A.; Childress, A. E., The forward osmosis Membrane bioreactor: A low fouling alternative to MBR processes. *Desalination* 2009, 239, 10-21.

Achilli, A., Cath, T., Childress, A. 2010. Selection of inorganic-based draw solutions for Forward osmosis applications. *Journal of Membrane Science* 364, 233-241.

Achilli, A., Cath, T. Y., Marchand, E. A., Childress, A. E. 2009. The forward osmosis Membrane bioreactor: A low fouling alternative to MBR processes. *Desalination* 239, 10-21.

Aelterman, P., Rabaey, K., Pham, H. T., Boon, N. And Verstraete, W., "Continuous Electricity generation at high voltages and currents using stacked microbial fuel cells," *Environmental Science and Technology,* 2010, 40(10), pp 3388-3394.

Anderson, L, The environmental benefits of water recycling and reuse. *Water Science And Technology: Water Supply* 2003, 3, (4), 1-10.

Angenent, L. T., Karim, K., AI-Dahhan, M. H., Wrenn, B. A., Domiguez-Espinosa, R. 2004. Production of bioenergy and biochemicals from industrial and agricultural wastewater. *Trends Biotechnol.* 22, 477-485.

Beaudry, E. G.; Lampi, K. A., Membrane technology for direct osmosis concentration of Fruit juice. *Food Technology* 1990, 44, 121.

Cao, X.; Huang, X.; Liang, P.; Xiao, K.; Zhou, Y.; Zhang, X.; Logan, B. E., A new method For water desalination using microbial desalination cells. *Environmental Science & Technology* 2009, 43, (18), 7148-52.

Cath, T. Y.; Childress, A. E.; Elimelech, M., Forward osmosis: principles, applications, And recent developments. *Journal of Membrane Science* 2006, 281, 70-87.

Cath, T. Y.; Childress, A. E., Membrane contactor processes for wastewater reclamation In space. II. Combined direct osmosis, osmotic distillation, and membrane distillation for Treatment of metabolic wastewater. *Journal of Membrane Science* 2005, 257, 111-119.

Cath, T. Y.; Gormly, S.; Beaudry, E. G.; Flynn, M. T.; Adams, V. D.; Childress, A. E., Membrane contactor processes for wastewater reclamation in space. I. Direct osmotic Concentration as pretreatment for reverse osmosis. *Journal of Membrane Science* 2005, 257, 85-98.

Cath, T. Y; Nathan T. Hancock; Carl D. Lundin; Christiane Hoppe-Jones; Drewes, J. E., A multi-barrier osmotic dilution process for simultaneous desalination and purification of Impaired water. *Journal of Membrane Science* 2010, 362, 417-426.

Chan, K.-y., K. H. Wong and P. K. Wong (1979). "Nitrogen and Phosphorus Removal From Sewage Effluent with High Salinity by *Chlorella Salina.*" *Environmental Pollution* 18: 8.

Charcosset, C., *Desalination*, 2009, 245, 214-231.

Chen, X., Xia, X., Liang, P., Cao, X., Sun H., and Huang, X., *Environ. Sci. Technol.*, 2011, 45, 2465-2470.

Cheng, S.; Xing, D.; Call, D.; Logan, B., Direct biological conversion of electrical current Into methane by electromethanogenesis. *Environmental Science & Technology* 2009, 43, (10), 3953-3958.

Chisti, Y. (2007). "Biodiesel from microalgae." *Biotechnology Advances* 25(3): 294-306.

Chisti, Y. (2008). "Biodiesel from microalgae beats bioethanol." *Trends in Biotechnology* 26(3): 126-131.

Chung, T.-S.; Zhang, S.; Wang, K. Y.; Su, r.; Ling, M. M., Forward osmosis processes: Yesterday, today and tomorrow *Desalination* 2012, 287, 78-81.

Clauwaert, P., K. Rabaey, P. Aelterman, L. D. Schamphelaire, T. H. Pham, P. Boeckx, N. Boon and W. Verstraete (2007). "Biological Denitrification in Microbial Fuel Cells." *Environmental Science & Technology* 41: 7.

Clauwaert, P.; Aelterman, P.; Pham, T. H.; De Schamphelaire, L.; Carballa, M.; Rabaey, K.; Verstraete, W., "Minimizing losses in bio-electrochemical systems: the road to applications," *Applied Microbiology and Biotechnology*, 2008, 79(6), pp 901-913.

Cornelissen, E. R., Harmsen, D., Beerendonk, E. F., Qin, J. J., *Water Science & Technology*, 2011, 63, 1557-1565.

Cusick, R. D. And B. E. Logan (2012). "Phosphate recovery as struvite within a single Chamber microbial electrolysis cell." *Bioresource Technology* 107: 110-115.

Fan, Y., H. Hu and H. Liu (2007). "Enhanced Coulombic efficiency and power density of Air-cathode microbial fuel cells with an improved cell configuration." *Journal of Power Sources* 171(2): 348-354.

Fan, Y., H. Hu and H. Liu (2007). "Sustainable powergeneration in Microbial Fuel Cells Using Bicarbonate Buffer and Proton Transfer Mechanisms." *Environmental Science & Technology* 41: 5.

Formero, J. J., M. Rosenbaum, M. A. Cotta and L. T. Angenent (2010). "Carbon Dioxide Addition to Microbial Fuel Cell Cathodes Maintains Sustainable Catholyte ph and Improves Anolyte ph, Alkalinity, and Conductivity." *Environmental Science & Technology* 44: 7.

Gao, Y; Li, W.; Lay, W. C. L.; Coster, H. G. L.; Fane, A G.; Tang, C. Y, Characterization Of forward osmosis membranes by electrochemical impedance spectroscopy. *Desalination* 2012, DOI: 1 0.1 016/j.desal.2012. 03. 006.

Ge, Z.; He, Z., Effects of draw solutions and membrane conditions on electricity Generation and water flux in osmotic microbial fuel cells. *Bioresource Technology* 2012, 109, 70-76.

Gil, G. C., Chang, L S., Kim, B. H., Kim, M., Jang, J. K., Park, H. S., Kim, H. J. 2003. Operational parameters affecting the performance of a mediator-less microbial fuel cell. *Biosens. Bioelectron.* 18, 327-334.

Grubera, M. F.; Johnsonc, C. R.; Tangd, C. Y; Jensenf, M. H.; Y Dec, L.; Helix Nielsena, C., Computational fluid dynamics simulations of flow and concentration polarization in forward Osmosis membrane systems. *Journal of Membrane Science* 2011, 379, 488-495.

Hancock, N. T.; Cath, T. Y, Solute coupled diffusion in osmotically driven membrane Processes. *Environ Sci Technol* 2009, 43, (17), 6769-75.

He, Z., One more function for microbial fuel cells in treating wastewater: producing high-quality Water. *CHEMIK* 2012, 66, 7-10.

He, Z., Minteer, S. D., Angenent, L. T., "Electricity generation from artificial wastewater Using an upflow microbial fuel cell," *Environmental Science and Technology*, 2005, 39(14), 5262-5267.

He, Z.; Wagner, N.; Minteer, S. D.; Angenent, L. T., An upflow microbial fuel cell with an Interior cathode: assessment of the internal resistance by impedance spectroscopy. *Environmental Science & Technology* 2006, 40, (17), 5212-5217.

He, Z., J. Kan, Y. Wang, Y. Huang, F. Mansfeld and K. H. Nealson (2009). "Electricity Production Coupled to Ammonium in a Microbial Fuel Cell." *Environmental Science & Technology* 43(9): 7.

Holloway, R. W.; Childress, A. E.; Dennett, K. E.; Cath, T. Y., Forward osmosis for Concentration of anaerobic digester centrate. *Water Research* 2007, 41, (17), 4005-14.

Hoffmann, J. P. (1998). "Wastewater Treatment with Suspended and Nonsuspended Algae." *Journal of Physology* 34: 7.

Hoover, L. A.; Phillip, W. A.; Tiraferri, A.; Yip, N. Y.; Elimelech, M., Forward with Osmosis: emerging applications for greater sustainability. *Environ Science & Technology* 2011, 45, (23), 9824-30.

Huang, C. H., Xu, T. W., "Electrodialysis with bipolar membranes for sustainable Development," *Environmental Science & Technology*, 2006, 40(17), pp 5233-5243.

Huang, Y., He, Z. And Mansfeld, F., "Performance of microbial fuel cells with and without Nafion solution as cathode binding agent," *Bioelectrochemistry*, 2010, 79, pp 261-264.

Jacobson, K. S.; Drew, D.; He, Z., Use of a liter-scale microbial desalination cell as a Platform to study bioelectrochemical desalination with salt solution or artificial seawater. *Environmental Science & Technology* 2011, 45, 4652-4657.

Jacobson, K., Drew, D. And He, Z., "Efficient salt removal in a continuously operated Upflow microbial desalination cell with an air cathode," *Bioresource Technology*, 2010, 102, pp 376-380.

Karagiannis, I. C., Soldatos, P. G., "Water desalination cost literature: review and Assessment," *Desalination*, 2008, 223 (1-3), pp 448-456.

Khawaji, A. D., Kutubkhanah, I. K., Wie, J. M., "Advances in seawater desalination Technologies," *Desalination*, 2008, 221(1-3), pp 47-69.

Kim, J., K. Kim, H. Ye, E. Lee, C. Shin, P. L. Mccarty and J. Bae (2011). "Anaerobic Fluidized Bed Membrane Bioreactor for Wastewater Treatment." *Environmental Science & Technology* 45: 6.

Kravath, R. E.; Davis, J. A., Desalination of seawater by direct osmosis. *Desalination* 1975, 16, 151-155.

Kumar, M.; Adham, S. S.; Pearce, W. R., "Investigation of seawater reverse osmosis Fouling and its relationship to pretreatment type," *Environmental Science & Technology*, 2006, 40(6), pp 2037-44.

Kuntke, P., K. M. Śmiech, H. Bruning, G. Zeeman, M. Saakes, T. H. J. A. Sleutels, H. V. M. Hamelers and C. J. N. Buisman (2012). "Ammonium recovery and energy production from Urine by a microbial fuel cell." *Water Research* 46(8): 2627-2636.

Lee, S.; Boo, c.; Elimelech, M.; Hong, S., Comparison of fouling behavior in forward Osmosis (Fa) and reverse osmosis (RO). *Journal of Membrane Science* 2010, 1-2, 34-39.

Leob, S., Large-scale power production by pressure-retarded osmosis using river water And sea water passing through spiral modules. *Desalination* 2002, 143, 115-122.

Li, D.; Zhang, X.; Yao, J.; Simon, G. P.; Wang, H., Stimuli-responsive polymer hydrogels As a new class of draw agent for forward osmosis desalination. *Chem Commun (Camb)* 2011, 47, (6), 1710-2.

Li, Z. Y; Yangali-Quintanilla, V.; Valladares-Linares, R.; Li, Q.; Zhan, T.; Amy, G., Flux Patterns and membrane fouling propensity during desalination of seawater by forward osmosis. *Water Res* 2012, 46, (1), 195-204.

Ling, M. M.; Wang, K. Y.; Chung, T.-S., Highly water-soluble magnetic nanoparticles as Novel draw solutes in forward osmosis for water reuse. *Industrial & Engineering Chemistry Research* 2010, 49, (12), 5869-5876.

Liu, H.; Grot, S.; Logan, B. E., "Electrochemically assisted microbial production of Hydrogen from acetate," *Environmental Science & Technology,* 2005, 39(11), p 4317-4320.

Logan, B. E., Hamelers, B., Rozendal, R A., Schroder, U., Keller, J., Freguia, S., Aeiterman, P., Verstraete, W., Rabaey, K., Microbial fuel cells: methodology and technology. *Environmental Science & Technology* 2006, 40, 5181-5192.

Logan, B. E.; Call, D.; Cheng, S.; Hamelers, H. V.; Sleutels, T. H.; Jeremiasse, A. W.; Rozendal, R. A., Microbial electrolysis cells for high yield hydrogen gas production from organic matter. *Environmental Science & Technology* 2008, 42, (23), 8630-40.

Logan, B. E. (2009). "Exoelectrogenic bacteria that power microbial fuel cells." *Nature Reviews* 7: 7.

Logan, B. E., Scaling up microbial fuel cells and other bioelectrochemical systems. *Applied Microbiology and Biotechnology* 2010, 85, (6), 1665-1671.

Luo, H.; Jenkins, P. E.; Ren, Z., "Concurrent desalination and hydrogen generation using Microbial electrolysis and desalination cells," *Environmental Science & Technology,* 2011, 45(1), Pp 340-344.

Luo, H., Xu, P., Roane, T. M., Jenkins P. E., and Ren, Z., *Bioresour. Technol.,* 2012, doi:10.1016/j.biortech.2011.11.098.

Masters, G. M., Ela, W. P. "Introduction to environmental engineering and science", 2008, Third ed. Prentice-Hall, Inc., Upper Saddle River, N.J.

Mathioulakis, E., Belessiotis, V., Delyannis, E., "Desalination by using alternative energy: Review and state-of-art," *Desalination,* 2007, 203, pp 346-365.

Mccarty, P. L.; Bae, L; Kim, J., Domestic Wastewater Treatment as a Net Energy Producer—Can This be Achieved? *Environ. Sci. Technol.* 2011, 45, (17), 7100-7106.

Mccutcheon, J. R.; Elimelech, M., Influence of concentrative and dilutive internal Concentration polarization on flux behavior in forward osmosis *Journal of Membrane Science* 2006, 284, (1-2), 237-247.

Mccutcheon, J. R.; mcginnis, R. L.; Elimelech, M., A novel ammonia—carbon dioxide Forward (direct) osmosis desalination process *Desalination* 2005, 174, (1), 1-11.

Mehanna, M.; Kiely, P. D.; Call, D. F.; Logan, B. E., "A microbial electrodialysis cell for Simultaneous water desalination and hydrogen gas production," *Environmental Science & Technology,* 2010, 44(24), pp 9578-9583.

Mehanna, M.; Saito, T.; Jingling, Y.; Hickner, M. A.; Cao, X.; Huang, X.; Logan, B. E., "Using microbial desalination cells to reduce water salinity prior to reverse osmosis," *Energy & Environmental Science,* 2010, 3(8), pp 1114-1120.

Menicucci, J.; Beyenal, H.; Marsili, E.; Veluchamy, R. R. A.; Demir, G.; Lewandowski, Z., "Procedure for determining maximum sustainable power generated by microbial fuel cells," *Environmental Science & Technology,* 2006, 40(3), pp 1062-1068.

Mi, B.; Elimelech, M., Chemical and physical aspects of organic fouling of forward Osmosis membranes. *Journal of Membrane Science* 2008, 320, 292-302.

Mohanakrishna, G., Venkata Mohan, S., Sarma, P. N., "Bio-electrochemical treatment of Distillery wastewater in microbial fuel cell facilitating decolorization and desalination along with Power generation," *Journal of Hazardous Materials,* 2010, 177(1-3), pp 487-94.

Muñoz, R. And B. Guieysse (2006). "Algal—bacterial processes for the treatment of Hazardous contaminants: A review." *Water Research* 40(15): 2799-2815.

Ng, H. Y.; Tang, W.; Wong, W. S., Performance of forward (direct) osmosis process: Membrane structure and transport phenomenon. *Environmental Science & Technology* 2006, 40, (7), 2408-13.

Pant, D.; Van Bogaert, G.; Diels, L.; Vanbroekhoven, K., A review of the substrates used In microbial fuel cells (mfcs) for sustainable energy production *Bioresource Technology* 2010, 101, (6), 1533-1543.

Park, J.-S., Choi, J.-H., Woo, J.-J., and Moon, S.-H., *J. Colloid Interface Sci.,* 2006, 300, 655-662.

Park, J. B. K. And R. J. Craggs (2010). "Wastewater treatment and algal production in High rate algal ponds with carbon dioxide addition." *Water Science & Technology* 61(3): 633.

Park, J. B. K., R. J. Craggs and A. N. Shilton (2011). "Wastewater treatment high rate Algal ponds for biofuel production." *Bioresource Technology* 102(1): 35-42.

Phillip, W. A., Yong, J. S., Elimelech, M. Reverse draw solute permeation in forward Osmosis: modeling and experiments. *Environmental Science & Technology* 2010, 44, 5170-5176.

Phuntsho, S.; Shan, H. K.; Hong, S.; Lee, S.; Vigneswaran, S., A novel low energy Fertilizer driven forward osmosis desalination for direct fertilization: Evaluating the performance Of fertilizer draw solutions. *Journal of Membrane Science* 2011, 375, 172-181.

Qin, J. J.; Chen, S.; Oo, M. H.; Kekre, K. A.; Cornelissen, E. R.; Ruiken, C. J., Experimental studies and modeling on concentration polarization in forward osmosis. *Water Science and Technology* 2010, 61, (11), 2897-904.

Quan, X., Wang, F., Zhao, Q., Zhao, T., Xiang, J. 2009. Air stripping of ammonia in a Water-sparged aerocyclone reactor. *J. Hazard. Mater.* 170, 983-988.

Rabaey, K.; Butzer, S.; Brown, S.; Keller, J.; Rozendal, R. A., High current generation Coupled to caustic production using a lamellar bioelectrochemical system. *Environmental Science & Technology* 2010, 44, (11), 4315-21.

Rabaey, K.; Keller, J., Microbial fuel cell cathodes: from bottleneck to prime opportunity? *Water Science and Technology* 2008, 57, (5), 655-659.

Rabaey, K.; Verstraete, W., "Microbial fuel cells: novel biotechnology for energy Generation," *Trends Biotechnol.,* 2005, 23(6), pp 291-298.

Raventos, N.; Macpherson, E.; Garcia-Rubies, A., "Effect of brine discharge from a Desalination plant on macrobenthic communities in the NW Mediterranean," *Marine Environmental Research,* 2006, 62(1), pp 1-14.

Rosenbaum, M., He, Z. And Angenent, L. T., "Light energy to bioelectrictiy: Photosynthetic microbial fuel cells", *Current Opinion in Biotechnology,* 2010, 21(3), pp 259-264.

Rozendal, R A., Hamelers, H. V. M., Buisman, C. J. N. Effects of membrane cation Transport on ph and microbial fuel cell performance. *Environmental Science & Technology* 2006, 40, 5206-5211.

Rozendal, R. A., Hamelers, H. V., Rabaey, K., Keller, J., Buisman, C. J., "Towards Practical implementation of bio-electrochemical wastewater treatment," *Trends in Biotechnology,* 2008, 26(8), pp 450-9.

Rittmann, B. E. (2008). "Opportunities for renewable bioenergy using microorganisms." *Biotechnology and Bioengineering* 100(2): 203-212.

Schnoor, J. L., "ES&T's Best Papers of 2009," *Environmental Science & Technology,* 2010, 44(7), pp 2219-2219.

Semiat, R., "Energy issues in desalination processes," *Environmental Science & Technology,* 2008, 42(22), pp 8193-201.

Shannon, M. A., Bohn, P. W., Elimelech, M., Georgiadis, J. G., Marinas, B. J., Mayes, A. M. 2008. Science and technology for water purification in the coming decades. *Nature* 452, 301-310.

Singer, E., New technologies deliver in treating neurological diseases. *Natural Medicines* 2004, 10, (12), 1267.

Strik, D. P. B. T. B., H. Terlouw, H. V. M. Hamelers and C. J. N. Buisman (2008). "Renewable sustainable biocatalyzed electricity production in a photosynthetic algal microbial Fuel cell (PAMFC)." *Applied Microbiology and Biotechnology* 81(4): 659-668.

Talaat, K. M., Forward osmosis process for dialysis fluid regeneration. *Artificial Organs* 2009, 33, (12), 1133-5.

Tanaka, Y. "Water dissociation in ion-exchange membrane electrodialysis," *Journal of Membrane Science,* 2002, 203(1-2), pp 227-244.

Ter Heijne, A., Hamelers, H. V., De Wilde, V., Rozendal, R. A., Buisman, C. J., "A bipolar Membrane combined with ferric iron reduction as an efficient cathode system in microbial fuel Cells," *Environmental Science & Technology,* 2006, 40(17), pp 5200-5.

Ugwu, C. U., H. Aoyagi and H. Uchiyama (2008). "Photobioreactors for mass cultivation Of algae." *Bioresource Technology* 99(10): 4021-4028.

Velasquez-Orta, S. B., T. P. Curtis and B. E. Logan (2009). "Energy from algae using Microbial fuel cells." *Biotechnology and Bioengineering* 103(6): 1068-1076.

Virdis, B., K. Rabaey, R. A. Rozendal, Z. Yuan and J. Keller (2010). "Simultaneous Nitrification, denitrification and carbon removal in microbial fuel cells." *Water Research* 44(9): 2970-2980.

Vrouwenvelder, J. S.; van der Kooij, D., "Diagnosis, prediction and prevention of Biofouling of NF and RO membranes," *Desalination,* 2001, 139(1-3), pp 65-71.

Wang, X., Cheng, S., Feng, Y., Merrill, M. D., Saito, T., Logan, B. E., "Use of carbon Mesh anodes and the effect of different pretreatment methods on power production in microbial Fuel cells," *Environmental Science & Technology,* 2009, 43(17), 6870-6874.

Xiao, L., J. Damien, J. Luo, H. D. Jang, J. Huang and Z. He (2012). "Crumpled graphene Particles for microbial fuel cell electrodes." *Journal of Power Sources* 208: 187-192.

Yang, Q.; Wang, K. Y.; Chung, T. S., Dual-layer hollow fibers with enhanced flux as Novel forward osmosis membranes for water production. *Environmental Science & Technology* 2009, 43, (8), 2800-5.

Yip, N. Y.; Tiraferri, A.; Phillip, W. A.; Schiffman, J. D.; Elimelech, M., High performance Thin-film composite forward osmosis membrane. *Environmental Science & Technology* 2010, 44, (10), 3812-8.

Zhang, F., Jacobson, K. S., Torres, P., He, Z. 2010. Effects of anolyte recirculation rates And catholytes on electricity generation in a liter-scale upflow microbial fuel cell. *Energy Environ. Sci.* 3, 1347-1352.

Zhang, F., Brastad, K., He, Z. 2011. Integrating forward osmosis into microbial fuel cells For wastewater treatment, water extraction and bioelectricity generation. *Environ. Sci. Technol.* 45, 6690-6696.

Zhang, B.; He, Z., Integrated salinity reduction and water recovery in an osmotic Microbial desalination cells. *RSC Advances* 2012, 2, 3265-3269.

Zhang, F. And Z. He (2012). "Simultaneous nitrification and denitrification with electricity Generation in dual-cathode microbial fuel cells." *Journal of Chemical Technology & Biotechnology* 87(1): 153-159.

Zhao, F.; Hamisch, F.; Schroder, U., Scholz, F.; Bogdanoff, P.; Hermann, I., Challenges And constraints of using oxygen cathodes in microbial fuel cells. *Environmental Science and Technology* 2006, 40, (17), 5193-5199.

Zhao, S.; Zou, L.; Tang, C. Y; Mulcahy, D., Recent developments in forward osmosis: Opportunities and challenges. *Journal of Membrane Science* 2012, 396, 1-21.

Zou, S.; Gu, Y; Xiao, D.; Tang, C. Y, The role of physical and chemical parameters on Forward osmosis membrane fouling during algae separation *Journal of Membrane Science* 2011, 366, (1-2), 356-362.

U.S. Patent Application Publication No. 2007/0259217 (Ser. No. 11/799,194)

U.S. Patent Application Publication No. 2010/0151279 (Ser. No. 12/710,710)

U.S. Patent Application Publication No. 2010/0270158 (Ser. No. 12/765,192)

U.S. Patent Application Publication No. 2011/0311887 (Ser. No. 13/160,929)

The invention claimed is:

1. A bioelectrochemical system, comprising:
   an anode at least partially positioned within an anode chamber containing a first aqueous reaction mixture including one or more organic compounds and one or more bacteria for oxidizing the organic compounds;
   an algal bioreactor containing a second aqueous reaction mixture including one or more nutrients and one or more algae for substantially removing the nutrients from the second aqueous reaction mixture; and
   a cathode at least partially positioned within the algal bioreactor, wherein the cathode at least partially surrounds the anode chamber.

2. The bioelectrochemical system of claim 1, further comprising a cation exchange material at least partially surrounding and defining the anode chamber.

3. The bioelectrochemical system of claim 1, wherein at least one of the anode chamber and the cathode is cylindrical.

4. The bioelectrochemical system of claim 1, further comprising an external supply of carbon dioxide.

5. The bioelectrochemical system of claim 4, wherein the algal bioreactor has an inlet for receiving the external supply of carbon dioxide.

6. The bioelectrochemical system of claim 5, wherein the second aqueous reaction mixture is a catholyte and the catholyte is substantially saturated with carbon dioxide.

7. The bioelectrochemical system of claim 6, wherein a reaction occurring at the cathode buffers a pH of the catholyte.

8. The bioelectrochemical system of claim 1, wherein the one or more algae produce oxygen and the oxygen is reduced by a reaction occurring at the cathode.

9. The bioelectrochemical system of claim 1, further comprising a second anode at least partially positioned within a respective second anode chamber.

* * * * *